US011122009B2

(12) United States Patent
Gurevich et al.

(10) Patent No.: US 11,122,009 B2
(45) Date of Patent: Sep. 14, 2021

(54) SYSTEMS AND METHODS FOR IDENTIFYING GEOGRAPHIC LOCATIONS OF SOCIAL MEDIA CONTENT COLLECTED OVER SOCIAL NETWORKS

(71) Applicant: Apple Inc., Cupertino, CA (US)

(72) Inventors: Olga Gurevich, San Francisco, CA (US); Rishab Aiyer Ghosh, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 497 days.

(21) Appl. No.: 13/853,687

(22) Filed: Mar. 29, 2013

(65) Prior Publication Data

US 2014/0040371 A1 Feb. 6, 2014

Related U.S. Application Data

(63) Continuation-in-part of application No. 13/158,992, filed on Jun. 13, 2011, now Pat. No. 11,036,810, and
(Continued)

(51) Int. Cl.
*G06F 16/29* (2019.01)
*H04L 29/12* (2006.01)
(Continued)

(52) U.S. Cl.
CPC .......... *H04L 61/609* (2013.01); *G06F 16/313* (2019.01); *G06F 16/951* (2019.01);
(Continued)

(58) Field of Classification Search
CPC .......... G06F 17/30241; G06F 17/3087; G06F 2221/2111; G06F 3/0237; G06F 3/04883;
(Continued)

(56) References Cited

U.S. PATENT DOCUMENTS 6,151,585 A 11/2000 Altschuler et al.
6,286,005 B1 9/2001 Cannon
(Continued)

FOREIGN PATENT DOCUMENTS

JP 2003288437 A 10/2003
WO WO-2006073977 A1 7/2006
(Continued)

OTHER PUBLICATIONS

Guha, R., Kumar, R., Raghavan, P., and Tomkins, A. 2004. Propagation of trust and distrust. In Proceedings of the 13th International Conference on World Wide Web (New York, NY, USA, May 17-20, 2004). WWW '04. ACM, New York, NY, pp. 403-412.
(Continued)

*Primary Examiner* — Alex Gofman
*Assistant Examiner* — Linh Black
(74) *Attorney, Agent, or Firm* — Womble Bond Dickinson (US) LLP

(57) ABSTRACT

A new approach is proposed that contemplates systems and methods to identify geographic locations of all social media content items retrieved form a social network in real time, wherein the geographic locations are physical locations from which the social media content items are originated or authored. If the latitude/longitude (geographic) coordinates of the content item are available, the geographic location of the social media content item can be identified using such geographic coordinates. For content items which geographic coordinates are not available, historical archive of content items with high-confidence of geographic locations are utilized to train a location classifier to predict geographic locations of such content items with high accuracy. Finally, the identified locations of the content items are confirmed to be accurate and are presented to a user together with the content items.

31 Claims, 24 Drawing Sheets

Related U.S. Application Data a continuation-in-part of application No. 12/895,593, filed on Sep. 30, 2010, now Pat. No. 7,991,725, and a continuation-in-part of application No. 12/628,801, filed on Dec. 1, 2009, now Pat. No. 8,244,664, and a continuation-in-part of application No. 12/628,791, filed on Dec. 1, 2009, now Pat. No. 8,688,701.

(60) Provisional application No. 61/354,551, filed on Jun. 14, 2010, provisional application No. 61/354,584, filed on Jun. 14, 2010, provisional application No. 61/354,556, filed on Jun. 14, 2010, provisional application No. 61/354,559, filed on Jun. 14, 2010, provisional application No. 61/617,524, filed on Mar. 29, 2012, provisional application No. 61/618,474, filed on Mar. 30, 2012.

(51) Int. Cl.
*H04W 4/029* (2018.01)
*H04W 4/21* (2018.01)
*H04W 4/02* (2018.01)
*G06F 16/31* (2019.01)
*G06F 16/951* (2019.01)
*G06F 16/9537* (2019.01)

(52) U.S. Cl.
CPC ........ *G06F 16/9537* (2019.01); *H04W 4/023* (2013.01); *H04W 4/029* (2018.02); *H04W 4/21* (2018.02)

(58) Field of Classification Search
CPC .............. G06F 3/04886; G06F 40/274; G06F 16/9535; G06F 16/438; G06F 16/29; G01S 5/0252; G06Q 30/0261; G06Q 30/00; G06Q 30/0251; G06Q 30/02; G06Q 50/01; G06Q 30/0269; G01C 21/26; H04L 51/32; H04L 67/22
USPC ................ 707/724, 726, 747, 758, 733–734, 707/E17.079, E17.08, E17.018, E17.123, 707/E17.009, E17.051
See application file for complete search history.

(56) References Cited

U.S. PATENT DOCUMENTS

| | | | |
|---|---|---|---|
| 7,143,091 B2* | 11/2006 | Charnock | G06F 17/30716 |
| 7,269,545 B2 | 9/2007 | Agichtein et al. | |
| 7,505,969 B2 | 3/2009 | Musgrove et al. | |
| 7,512,612 B1 | 3/2009 | Akella et al. | |
| 7,636,714 B1 | 12/2009 | Lamping et al. | |
| 7,885,844 B1 | 2/2011 | Cohen et al. | |
| 8,010,619 B1 | 8/2011 | Lawler et al. | |
| 8,086,605 B2 | 12/2011 | Xu et al. | |
| 8,156,115 B1* | 4/2012 | Erol et al. | 707/728 |
| 8,166,026 B1 | 4/2012 | Sadler | |
| 8,166,925 B2 | 4/2012 | Suggett | |
| 8,200,700 B2 | 6/2012 | Moore | |
| 8,326,880 B2 | 12/2012 | Carson | |
| 8,352,549 B2 | 1/2013 | Sacco et al. | |
| 8,572,173 B2 | 10/2013 | Briere et al. | |
| 8,694,357 B2 | 4/2014 | Ting et al. | |
| 8,909,629 B2* | 12/2014 | Seth et al. | 707/724 |
| 8,990,235 B2* | 3/2015 | King | G06F 40/197 707/759 |
| 9,245,055 B2* | 1/2016 | Krois | G06F 17/30991 |
| 9,626,685 B2* | 4/2017 | Martinez | G06Q 30/02 |
| 2003/0110056 A1 | 6/2003 | Berghofer et al. | |
| 2003/0229531 A1 | 12/2003 | Heckerman et al. | |
| 2004/0225592 A1 | 11/2004 | Churquina | |
| 2005/0060312 A1 | 3/2005 | Curtiss et al. | |
| 2005/0131897 A1 | 6/2005 | Grasso et al. | |
| 2005/0154690 A1 | 7/2005 | Nitta et al. | |
| 2005/0192957 A1 | 9/2005 | Newbold | |
| 2005/0256866 A1 | 11/2005 | Lu et al. | |
| 2006/0023945 A1* | 2/2006 | King | H04N 1/00244 382/173 |
| 2006/0041543 A1 | 2/2006 | Achlioptas | |
| 2006/0059055 A1 | 3/2006 | Lin | |
| 2006/0074836 A1 | 4/2006 | Gardner et al. | |
| 2006/0112111 A1 | 5/2006 | Tseng et al. | |
| 2006/0112146 A1 | 5/2006 | Song et al. | |
| 2006/0218577 A1 | 9/2006 | Goodman et al. | |
| 2006/0248073 A1 | 11/2006 | Jones et al. | |
| 2006/0294085 A1 | 12/2006 | Rose et al. | |
| 2006/0294086 A1 | 12/2006 | Rose et al. | |
| 2006/0294134 A1 | 12/2006 | Berkhim et al. | |
| 2007/0027744 A1 | 2/2007 | Carson et al. | |
| 2007/0078699 A1 | 5/2007 | Scott et al. | |
| 2007/0121843 A1 | 5/2007 | Atazky et al. | |
| 2007/0124432 A1 | 5/2007 | Holtzman et al. | |
| 2007/0150398 A1 | 6/2007 | Rossen et al. | |
| 2007/0156636 A1 | 7/2007 | Norton et al. | |
| 2007/0168533 A1 | 7/2007 | Canright et al. | |
| 2007/0208613 A1 | 9/2007 | Backer | |
| 2007/0219863 A1 | 9/2007 | Park et al. | |
| 2007/0226248 A1 | 9/2007 | Darr | |
| 2007/0282867 A1 | 12/2007 | McAllister et al. | |
| 2007/0297405 A1 | 12/2007 | He | |
| 2008/0004942 A1 | 1/2008 | Calabria | |
| 2008/0010253 A1 | 1/2008 | Sidhu et al. | |
| 2008/0059466 A1 | 3/2008 | Luo et al. | |
| 2008/0082405 A1* | 4/2008 | Martinez | G06Q 30/00 705/14.17 |
| 2008/0104225 A1 | 5/2008 | Zhang et al. | |
| 2008/0133426 A1 | 6/2008 | Porat et al. | |
| 2008/0215429 A1 | 9/2008 | Ramer et al. | |
| 2008/0215557 A1 | 9/2008 | Ramer et al. | |
| 2008/0215571 A1 | 9/2008 | Huang et al. | |
| 2008/0244038 A1* | 10/2008 | Martinez | G06F 17/30876 709/218 |
| 2008/0270116 A1 | 10/2008 | Godbole | |
| 2008/0275833 A1 | 11/2008 | Zhou et al. | |
| 2008/0288305 A1 | 11/2008 | LaLuzerne et al. | |
| 2008/0288596 A1 | 11/2008 | Smith et al. | |
| 2008/0313011 A1 | 12/2008 | Rose et al. | |
| 2009/0005975 A1* | 1/2009 | Forstall et al. | 701/209 |
| 2009/0048860 A1 | 2/2009 | Brotman | |
| 2009/0049038 A1 | 2/2009 | Gross | |
| 2009/0049308 A1 | 2/2009 | Gross | |
| 2009/0106224 A1 | 4/2009 | Roulland et al. | |
| 2009/0106244 A1 | 4/2009 | Dash et al. | |
| 2009/0112683 A1* | 4/2009 | Hamilton, II | G06Q 30/02 705/7.32 |
| 2009/0119173 A1* | 5/2009 | Parsons et al. | 705/14 |
| 2009/0164904 A1* | 6/2009 | Horowitz | G06F 17/30817 715/723 |
| 2009/0234828 A1 | 9/2009 | Tu | |
| 2009/0240647 A1 | 9/2009 | Green et al. | |
| 2009/0276500 A1 | 11/2009 | Karmarkar | |
| 2009/0319342 A1 | 12/2009 | Shilman et al. | |
| 2010/0058196 A1 | 3/2010 | Krishnan et al. | |
| 2010/0070448 A1 | 3/2010 | Omoigui | |
| 2010/0094835 A1* | 4/2010 | Lu | G06F 17/30672 707/705 |
| 2010/0100537 A1 | 4/2010 | Druzgalski et al. | |
| 2010/0119053 A1 | 5/2010 | Goeldi | |
| 2010/0121817 A1 | 5/2010 | Meyer | |
| 2010/0121839 A1 | 5/2010 | Meyer | |
| 2010/0121849 A1* | 5/2010 | Goeldi | 707/736 |
| 2010/0145947 A1* | 6/2010 | Kolman | H04L 67/18 707/736 |
| 2010/0174692 A1 | 7/2010 | Meyer | |
| 2010/0306192 A1 | 12/2010 | Kapur et al. | |
| 2010/0306249 A1* | 12/2010 | Hill | G06Q 50/01 707/769 |
| 2010/0312769 A1* | 12/2010 | Bailey | G06F 17/30705 707/740 |
| 2011/0004465 A1 | 1/2011 | Rose et al. | |

(56) References Cited

U.S. PATENT DOCUMENTS

| | | | |
|---|---|---|---|
| 2011/0004483 A1* | 1/2011 | Ting | G06Q 30/02 705/1.1 |
| 2011/0022602 A1 | 1/2011 | Luo et al. | |
| 2011/0035284 A1* | 2/2011 | Moshfeghi | G06Q 30/02 705/14.58 |
| 2011/0040552 A1 | 2/2011 | Van Guilder et al. | |
| 2011/0040655 A1* | 2/2011 | Hendrickson | G06Q 30/02 705/27.1 |
| 2011/0078156 A1 | 3/2011 | Koss | |
| 2011/0093459 A1 | 4/2011 | Dong et al. | |
| 2011/0125793 A1* | 5/2011 | Erhart | H04L 51/32 707/776 |
| 2011/0145718 A1* | 6/2011 | Ketola | G06F 3/04815 715/739 |
| 2011/0179020 A1* | 7/2011 | Ozzie | G06F 17/3089 707/723 |
| 2011/0191372 A1 | 8/2011 | Kaushansky et al. | |
| 2011/0212717 A1 | 9/2011 | Rhoads et al. | |
| 2011/0218946 A1* | 9/2011 | Stern | H04L 12/1859 706/12 |
| 2011/0258049 A1* | 10/2011 | Ramer | G06Q 30/02 705/14.66 |
| 2011/0270705 A1* | 11/2011 | Parker | G06Q 30/0603 705/26.61 |
| 2011/0288917 A1* | 11/2011 | Wanek | G06Q 30/0252 705/14.5 |
| 2012/0022865 A1* | 1/2012 | Milstein | G10L 15/10 704/235 |
| 2012/0066073 A1* | 3/2012 | Dilip | G06Q 30/0269 705/14.66 |
| 2012/0166438 A1 | 6/2012 | Wu et al. | |
| 2013/0086072 A1* | 4/2013 | Peng | G06F 16/9537 707/743 |
| 2013/0145024 A1* | 6/2013 | Cao | H04L 67/22 709/224 |
| 2014/0258280 A1* | 9/2014 | Wilson | G06F 17/30241 707/724 |

FOREIGN PATENT DOCUMENTS

| | | |
|---|---|---|
| WO | WO2006/116516 A2 | 11/2006 |
| WO | WO2008/006059 A2 | 1/2008 |

OTHER PUBLICATIONS

Ziegler, C. and Lausen, G. 2005. Propagation Models for Trust and Distrust in Social Networks. Information Systems Frontiers 7, 4-5 (Dec. 2005), 337-358.
Tao, Yufei et al: "Selectivity Estimation of Predictive Spatio-Temporal Queries", Proceedings 19th International Conference on Data Engineering (ICDE'2003). Bangladore, India, Mar. 5-8, 2003; pp. 417-428.
Dai, Na et al: "Mining Anchor Text Trends for Retrieval" Mar. 28, 2010; pp. 127-139.
Ashkan, Azin et al: "Classifying and Characterizing Query Intent", Apr. 6, 2009, pp. 578-586.
Garfield, E.: "Citation Analysis as a Tool in Journal Evaluation", 1972, pp. 527-544, XP002381248.
Johnson, Caleb: "Likebutton.me Reveals What Your Friends 'Like' Across the Web"; Apr. 26, 2010, pp. 1-7; XP000002656471.
Anonymous: "H-index", Wikipedia, Internet Article, Jun. 10, 2010; pp. 1-3; XP000002656472.
Dietz, Laura et al: "Unsupervised Prediction of Citation Influences", Proceedings of the 24th International Conference on Machine Learning, Jun. 20, 2007; pp. 233-240; XP55004362.
Huang, Jeff et al: "Conversational Tagging in Twitter", Proceedings of the 21st ACM Conference on Hypertext and Hypermedia; Jun. 13, 2010; p. 173; XP55004356.
Page, L. et al: "The PageRank Citation Ranking: Bringing Order to the Web", Internet Citation; Jan. 29, 1998; XP002213518.
Massa, Paolo et al: "Using Trust in Recommender Systems: An Experimental Analysis"; Feb. 26, 2004; pp. 221-235, section 1.1; pp. 222-223, sections 1.3 and 2; pp. 225-227.
Liu, "Co-authorship networks in the digital library research community", 2005, Elsevier, Information Processing and Management 41 (2005) pp. 1462-1480.
Von Der Weth, "Towards an objective assessment of centrality measures in reputation systems", 2007, IEEE, 0-7695-2913.
Zhou, "Powertrust: A robust and scalable reputation system for trusted peer-to-peer computing", 2007, IEEE, 1-45-921907.
Lu at al., "Finding Query Suggestions for PubMed", 2009, AMIA.
Makkonen et al., Topic Detection and Tracking with Spatio-Temporal Evidence, published Spring 2003.
Fan, et al., "Suggesting Topic-Based Query Terms as Your Type", 2010 12th International Asia-Pacific Web Conference (Apr. 2010).

* cited by examiner

| Top Links | Mentions |
|---|---|
| NBA - Hoy a las 9:30pm, (18-21) vs. Milwaukee (15-24), véalo...<br>Mar 9, 2012 3:20 PM | 10 |
| Milwaukee Bucks vs New York Knicks Live Stream Online<br>Mar 9, 2012 3:20 PM | 30 |
| Cuban calls own statement 'totally sophomoric'... #NBA #Dallas...<br>Mar 9, 2012 3:20 PM | 2 |
| Ken Berger - CBSSports.com Trade Deadline Update<br>Mar 9, 2012 2:37 PM | 27 |
| Boston might trade one of "Big Three" but price is steep #PBT...<br>Mar 9, 2012 2:42 PM | 11 |
| Watch Live Cleveland Cavaliers - Oklahoma City Thunder Online...<br>Mar 9, 2012 3:18 PM | 9 |

FIG. 15

| Top Posts | | Terms | | Top posts from 7 pm - 8 pm about "#nba" | Export |

@jalenrose JALEN ROSE
My 2 cents. If Howard got a "star" player to come play w/him in Orlando he could contend for a title yearly. He is that good. #NBA
*Thu Mar 8 7:48 pm*

@moluskein Molusco
NBA Hoy los Bulls estan mas malos que las papas majadas que daban en el comedor escolar...
*Thu Mar 8 7:40 pm*

Basket Last News @basket_lastnews Basket Last News
Orlando Magic 99 - 94 Chicago Bulls #NBA
*Thu Mar 8 7:47 pm*

NBC Sports @nbcsports NBC Sports
Magic make Bulls' winning streak disappear. http://t.co/ohkSmoko #nba #magic #bulls
*Thu Mar 8 7:49 pm*

@basketballtalk Kurt Helin
Derrick Rose is just like you - Sick of Dwight Howard talk http://t.co/IHxQC1oW #PBT #NBA
*Thu Mar 8 7:33 pm*

Show More

FIG. 20

SYSTEMS AND METHODS FOR IDENTIFYING GEOGRAPHIC LOCATIONS OF SOCIAL MEDIA CONTENT COLLECTED OVER SOCIAL NETWORKS

RELATED APPLICATIONS

This application is a continuation-in-part of current U.S. application Ser. No. 13/158,992 filed Jun. 13, 2011, which claims the benefit of U.S. Provisional Patent Application No. 61/354,551, 61/354,584, 61/354,556, and 61/354,559, all filed Jun. 14, 20010. U.S. application Ser. No. 13/158,992 is also a continuation in part of U.S. Pat. No. 7,991,725 issued Aug. 2, 2011, a continuation in part of U.S. Pat. No. 8,244,664 issued Aug. 14, 2012, and a continuation in part of current U.S. application Ser. No. 12/628,791 filed Dec. 1, 2009.

This application claims the benefit U.S. Provisional Patent Application No. 61/617,524, filed Mar. 29, 2012, and entitled "Social Analysis System," and is hereby incorporated herein by reference.

This application claims the benefit of U.S. Provisional Patent Application No. 61/618,474, filed Mar. 30, 2012, and entitled "GEO-Tagging Enhancements," and is hereby incorporated herein by reference.

BACKGROUND

Social media networks such as Facebook®, Twitter®, and Google Plus® have experienced exponential growth in recently years as web-based communication platforms. Hundreds of millions of people are using various forms of social media networks every day to communicate and stay connected with each other. Consequently, the resulting activities/content items from the users on the social media networks, such as tweets posted on Twitter®, become phenomenal and can be collected for various kinds of measurements, presentation and analysis. Specifically, these user activity data can be retrieved from the social data sources of the social networks through their respective publicly available Application Programming Interfaces (APIs), indexed, processed, and stored locally for further analysis.

These stream data from the social networks collected in real time, along with those collected and stored over time, provide the basis for a variety of measurements, presentation and analysis. Some of the metrics for measurements and analysis include but are not limited to:

Number of mentions—Total number of mentions for a keyword, term or link;
Number of mentions by influencers—Total number of mentions for a keyword, term or link by an influential user;
Number of mentions by significant posts—Total number of mentions for a keyword, term or link by tweets that have been re-tweeted or contain a link;
Velocity—The extent to which a keyword, term or link is "taking off" in the preceding time windows (e.g., seven days).

Unlike traditional web traffic sources, social media content items such as citations/Tweets/posts do not have IP address identifiers to identify their geographic locations. In addition, for privacy reasons, social media sources or social networks (such as Twitter®, Facebook®, Blogs, review sites, websites, public conversation repositories, Internet Chat systems) generally do not provide IP addresses for their users' posts in real-time APIs available to third parties.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

FIG. 15 depicts an example of a snapshot of top links related to keywords mentioned on a social network.

FIG. 20 depicts an example of viewing of top posts with a specific time range on a social network.

DETAILED DESCRIPTION OF EMBODIMENTS

The approach is illustrated by way of example and not by way of limitation in the figures of the accompanying drawings, in which like references indicate similar elements. It should be noted that references to "an" or "one" or "some" embodiment(s) in this disclosure are not necessarily to the same embodiment, and such references mean at least one.

A new approach is proposed that contemplates systems and methods to identify geographic locations of all social media content items retrieved form a social network in real time, wherein the geographic locations are physical locations from which the social media content items are originated or authored. If the latitude/longitude (geographic) coordinates of the content item are available, the geographic location of the social media content item can be identified using such geographic coordinates. For content items whose geographic coordinates are not available, a historical archive of content items with high-confidence geographic locations is utilized to train a location classifier to predict geographic locations of such content items with high accuracy. Finally, the identified locations of the content items are confirmed to be accurate and presented to a user together with the content items.

As referred to hereinafter, a social media network or social network, can be any publicly accessible web-based platform or community that enables its users/members to post, share, communicate, and interact with each other. For non-limiting examples, such social media network can be but is not limited to, Facebook®, Google+®, Twitter®, LinkedIn®, blogs, forums, or any other web-based communities.

As referred to hereinafter, a user's activities/content items on a social media network include but are not limited to, citations, Tweets, replies and/or re-tweets to the tweets, posts, comments to other users' posts, opinions (e.g., Likes), feeds, connections (e.g., add other user as friend), references, links to other websites or applications, or any other activities on the social network. Such social content items are alternatively referred to hereinafter as citations, Tweets, or posts. In contrast to a typical web content, whose creation time may not always be clearly associated with the content, one unique characteristic of a content item on the social network is that there is an explicit time stamp associated with the content, making it possible to establish a pattern of the user's activities over time on the social network.

Figure 1:
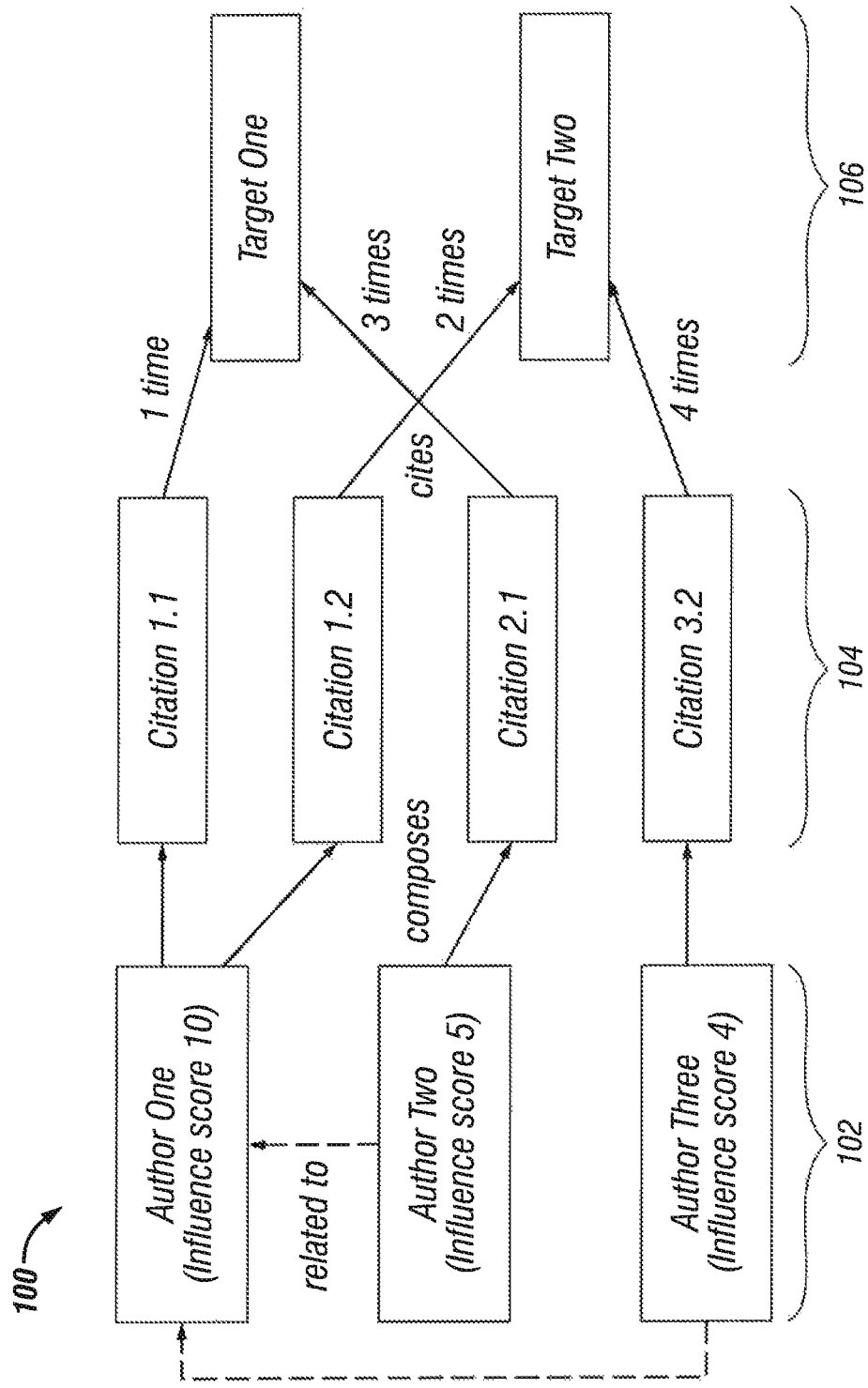
FIG. 1 depicts an example of a citation diagram comprising a plurality of citations.

FIG. 1 depicts an example of a citation graph/diagram 100 comprises a plurality of citations 104, each describing an opinion of the object by a source/subject 102. The nodes/entities in the citation diagram 100 are characterized into two categories, 1) subjects 102 capable of having an opinion or creating/making citations 104, in which expression of such opinion is explicit, expressed, implicit, or imputed through any other technique; and 2) objects 106 cited by citations 104, about which subjects 102 have opinions or make citations. Each subject 102 or object 106 in diagram 100 represents an influential entity, once an influence score for that node has been determined or estimated. More specifically, each subject 102 may have an influence score indicating the degree to which the subject's opinion influences other subjects and/or a community of subjects, and each object 106 may have an influence score indicating the collective opinions of the plurality of subjects 102 citing the object.

In some embodiments, subjects 102 representing any entities or sources that make citations may correspond to one or more of the following:

Representations of a person, web log, and entities representing Internet authors or users of social media services including one or more of the following: blogs, Twitter®, or reviews on Internet web sites;

Users of microblogging services such as Twitter®;

Users of social networks such as MySpace® or Facebook®, bloggers;

Reviewers, who provide expressions of opinion, reviews, or other information useful for the estimation of influence.

In some embodiments, some subjects/authors 102 who create the citations 104 can be related to each other, for a non-limiting example, via an influence network or community and influence scores can be assigned to the subjects 102 based on their authorities in the influence network.

In some embodiments, objects 106 cited by the citations 104 may correspond to one or more of the following: Internet web sites, blogs, videos, books, films, music, image, video, documents, data files, objects for sale, objects that are reviewed or recommended or cited, subjects/authors, natural or legal persons, citations, or any entities that are or may be associated with a Uniform Resource Identifier (URI), or any form of product or service or information of any means or form for which a representation has been made.

In some embodiments, the links or edges 104 of the citation diagram 100 represent different forms of association between the subject nodes 102 and the object nodes 106, such as citations 104 of objects 106 by subjects 102. For non-limiting examples, citations 104 can be created by authors citing targets at some point of time and can be one of link, description, keyword or phrase by a source/subject 102 pointing to a target (subject 102 or object 106). Here, citations may include one or more of the expression of opinions on objects, expressions of authors in the form of Tweets, blog posts, reviews of objects on Internet web sites Wikipedia® entries, postings to social media such as Twitter® or Jaiku®, postings to websites, postings in the form of reviews, recommendations, or any other form of citation made to mailing lists, newsgroups, discussion forums, comments to websites or any other form of Internet publication.

In some embodiments, citations 104 can be made by one subject 102 regarding an object 106, such as a recommendation of a website, or a restaurant review, and can be treated as representation an expression of opinion or description. In some embodiments, citations 104 can be made by one subject 102 regarding another subject 102, such as a recommendation of one author by another, and can be treated as representing an expression of trustworthiness. In some embodiments, citations 104 can be made by certain object 106 regarding other objects, wherein the object 106 is also a subject.

In some embodiments, citation 104 can be described in the format of (subject, citation description, object, timestamp, type). Citations 104 can be categorized into various types based on the characteristics of subjects/authors 102, objects/targets 106 and citations 104 themselves. Citations 104 can also reference other citations. The reference relationship among citations is one of the data sources for discovering influence network.

Figure 2:
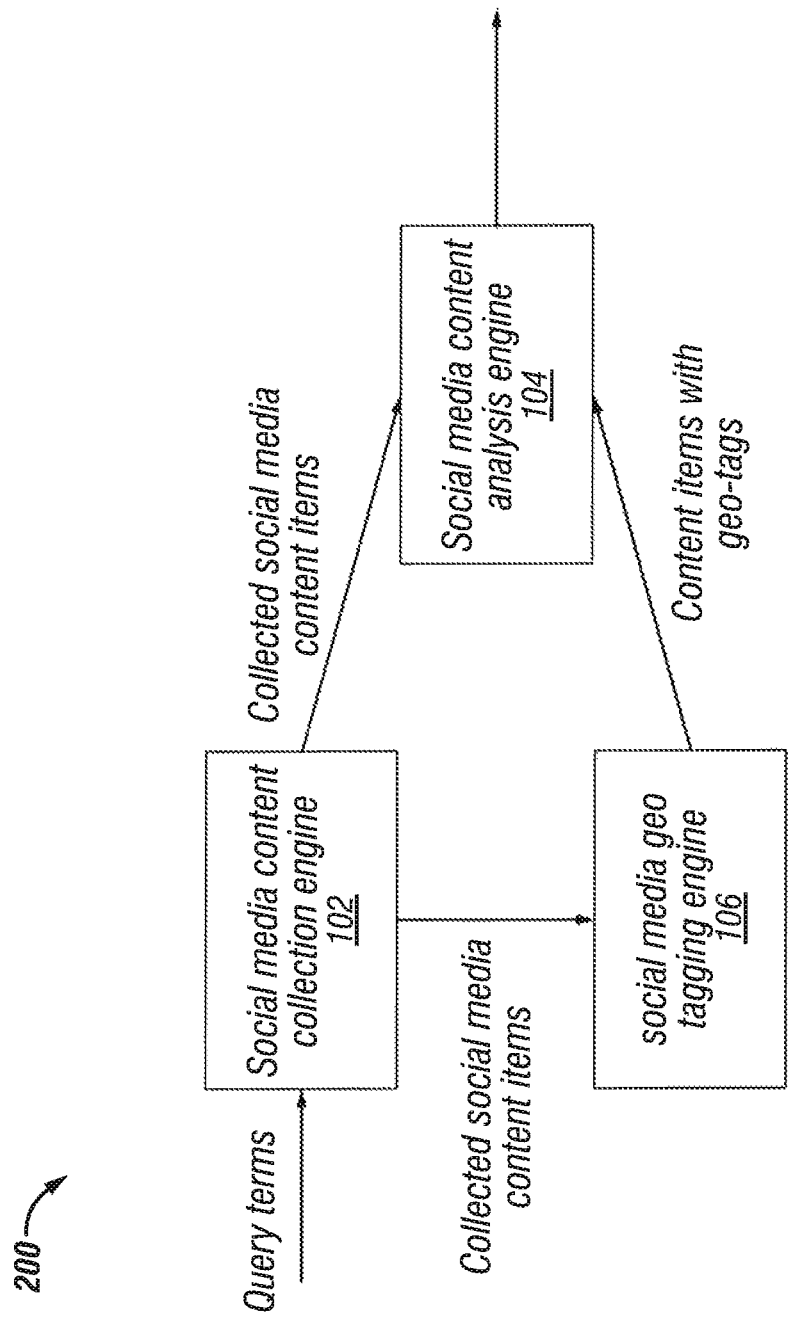
FIG. 2 depicts an example of a system diagram to support interactive presentation and analysis of content over social networks.

FIG. 2 depicts an example of a system diagram to support interactive presentation and analysis of content over social networks. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 2, the system 200 includes at least social media content collection engine 102, social media content analysis engine 104, and social media geo tagging engine 106. As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 2, each of the engines can run on one or more hosting devices (hosts). Here, a host can be a computing device, a communication device, a storage device, or any electronic device capable of running a software component. For non-limiting examples, a computing device can be but is not limited to a laptop PC, a desktop PC, a tablet PC, an iPod®, an iPhone®, an iPad®, Google's Android® device, a PDA, or a server machine. A storage device can be but is not limited to a hard disk drive, a flash memory drive, or any portable storage device. A communication device can be but is not limited to a mobile phone.

In the example of FIG. 2, each of the engines has a communication interface (not shown), which is a software component that enables the engines to communicate with each other following certain communication protocols, such as TCP/IP protocol, over one or more communication networks (not shown). Here, the communication networks can be but are not limited to, internet, intranet, wide area network (WAN), local area network (LAN), wireless network, Bluetooth®, WiFi, and mobile communication network. The physical connections of the network and the communication protocols are well known to those of skill in the art.

Search of Contents over Social Network

In the example of FIG. 2, social media content collection engine 102 searches for and collects social media content items (e.g., citations, Tweets, or posts) by enabling a user to enter one or more keywords via a user interface to perform a query search over one or more social networks. As used hereinafter, keywords are the basic units for searches and can be grouped into saved topics as shown in the non-limiting example of FIG. 3. Social media content collection engine 102 enables the user to enter multiple keywords by entering them as a comma-delimited list. For a non-limiting example, entering "egypt, syria, libya, sudan" in the search box will automatically input these four terms as separate keywords for the search. When multiple keywords are entered, social media content collection engine 102 does search and keyword matching over the social media content utilizing OR operators. For a non-limiting example, a search query with keywords: 'jan #21, #feb17, Egypt, Libya' will match all results associated with #jan21, #feb17, Egypt, OR Libya. In some embodiments, social media content collection engine 102 also supports Boolean search for content searches to enable both OR and AND operators.

In some embodiments, social media content collection engine 102 utilizes explicit first order literal matching of keywords over the social networks. Specifically, social media content collection engine 102 may search for keywords in a citation/Tweet's 'text' field. If a Tweet is a native re-tweet, then social media content collection engine 102 searches in the citation/Tweet's 'retweeted_status→text' field. Here, keyword matches of the social content are case-insensitive. For a non-limiting example, 'gadaffi' will match 'gadaffi' or 'Gadaffi' or 'GADAFFI' but will not match on 'kadaffi' or 'qadhafi' or '#gadaffi', and '#gadafficrimes' will match 'itgadafficrimes' or '#Gadafficrimes' but will not match on 'gadafficrimes.'

In some embodiments, social media content collection engine 102 may remove punctuations determined as extraneous when matching the keywords. Here, the punctuations to be ignored when matching keywords include but are not limited to, the, to, and, on, in, of, for, i, you, at, with, it, by, this, your, from, that, my an, what, as, For a non-limiting example, if 'airplane' or 'airplane!' appeared in the Tweet's text as a standalone word or at the end of a tweet, then it would return as a match for 'airplane.'

In some embodiments, social media content collection engine 102 enables matching based on commonly used citation conventions on social networks. For a non-limiting example, social media content collection engine 102 would enable the user to match on citations/tweets about a stock by using the common Twitter® convention for referencing a stock by inserting a dollar sign in front of the ticker symbol, e.g., Tweets about Apple can be matched using the keyword '$aapl' which will match all tweets that contain the text '$aapl' or '$AAPL.'

Figures 3, 4:
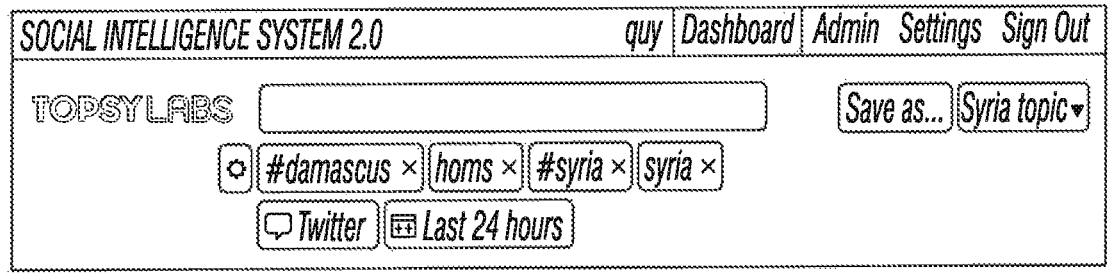
FIG. 3 depicts an example of a user interface used for conducting a query search over a social network.
FIG. 4 depicts an example of a user interface used for saving a search topic over a social network.

In some embodiments, the user interface of the social media content collection engine 102 further provides a plurality of search options via a search menu (shown as the gear image to the left of keywords in the example of FIG. 3). For non-limiting examples, such search options include but are not limited to:

New topic, which clears the current list of keywords/search terms and allows the user to start a new search from scratch. It is important to make sure that the current topics (list of keywords and parameters) are saved before proceeding to the new topic.

Enable all, which turns on all keywords listed for the search whether they are currently enabled (not grayed out) or not.

Revert topic, which refreshes the search results with the keywords and parameters from the current topic.

Share topic, which shares the list of keywords and parameters easily with others by cutting and pasting the URL into an email or an instant message.

In some embodiments, the social media content collection engine 102 provides at least two options for the displaying keywords in the search result:

Enabled, which displays the one keyword or multiple keywords selected in the analysis of the search result.

Isolated, which automatically turns off all the keywords other than the one selected in the analysis of the search result.

Exporting and Sharing of Social Media Content

In some embodiments, the social media content collection engine 102 enables the user to save user-defined sets of keywords and report parameters that define a search as a saved topic/search. Saved topics can be used as logical groupings of terms/keywords commonly associated with a particular country or event (e.g., #egypt, #mubarak, #muslimbrotherhood, #jan25, @egyptocracy). Such saved topic or search allows users to save keywords and parameters so they can be used again as shown in the example depicted in FIG. 4.

Figure 5:
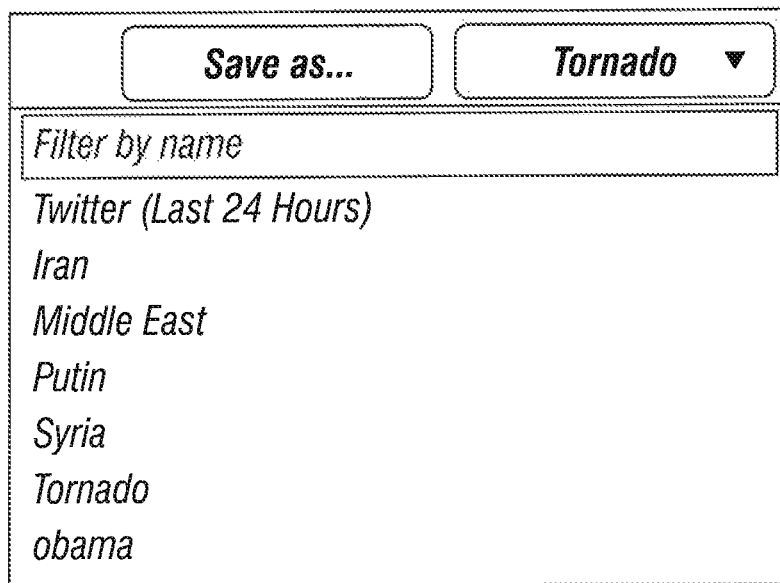
FIG. 5 depicts an example of a dropdown menu for saved search topics over a social network.

In some embodiments, social media content collection engine 102 provides a saved search dropdown menu, which allows the user to easily find and retrieve previously saved topics. If there are a lot of saved searches, the user can enter parts of the saved search name in a search box to find the specified search topic as shown in the example depicted in FIG. 5.

In some embodiments, social media content collection engine 102 enables a user to download a saved topic/search and the corresponding search results from the topic to a specific file/date format (e.g., CSV format) by clicking the Export button on the user interface. In addition, social media content collection engine 102 may also provide an Application Programming Interface (API) URL for users who want to access the Secure Reporting API to programmatically retrieve data. All citations/Tweets from the search query can be downloaded in batch mode, including those "significant posts", which are tweets that have links or tweets that have been re-tweeted.

In some embodiments, social media content collection engine 102 enables a user to copy a topic by clicking the "Save As . . . " button and choosing "Create a new Topic" to save a copy of the existing topic under a new name. Social media content collection engine 102 further enables a user to share a topic with another user by clicking the gear icon next to the list of keywords (as shown in FIG. 3) and choosing the Share topic menu option. Social media content collection engine 102 will generate a unique topic URL that the user can copy to share with another user. For a non-limiting example, the topic URL can be in the format: https://"SOCIALANALYSIS SYSTEM".topsy.com/share/[view]?id=[XXX], where XXX is a unique topic id. Any user on the same social media content analysis system/platform can view a topic from another user as long as the user is given a valid Topic URL. Please note that social media content collection engine 102 keeps all topic URLs private and requires a system account for another user to login to view the topic.

Filtering of Social Media Content

Figure 6:
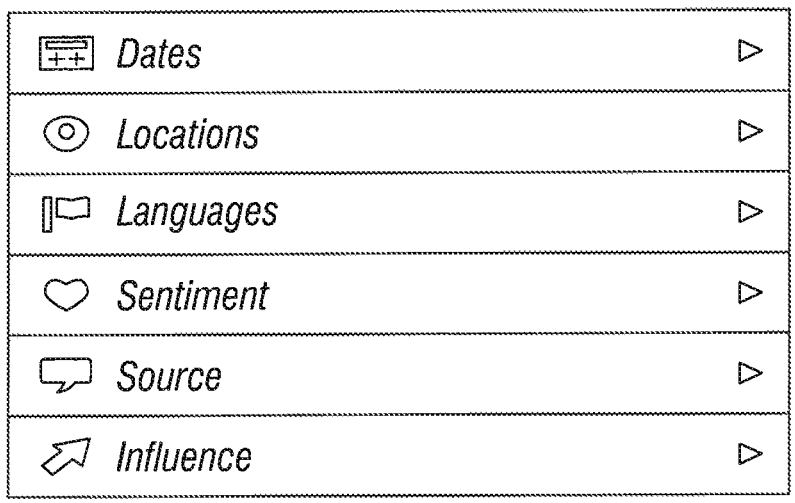
FIG. 6 depicts an example of a plurality of parameters used to refine search results over a social network.

In the example of FIG. 2, social media content collection engine 102 enables a user to refine search results by the a plurality of parameters, which include but are not limited to dates, locations, languages, sentiment, source, and influence of the citations/Tweets collected as shown by the example depicted in FIG. 6. When multiple filters are selected, they will be applied by social media content collection engine 102 based on the AND operator. For a non-limiting example, selecting a location filter on 'Libya, Syria, Lebanon' and language filter on 'English' will match all results located in 'Libya, Syria, OR Lebanon' AND in the English language.

Figure 7:
FIG. 7 depicts an example of time ranges used to refine search results over a social network.

In some embodiments, social media content collection engine 102 enables the user to restrict the search results based on dates/timestamps of the citation. For a non-limiting example, the default selection of time range can be last 24 hours, which can be changed to any of the following: last hour, last 24 hours, last 7 days, last 30 days, last 90 days, last 180 days, or a specific date range as specified by the user as shown by the example depicted in FIG. 7.

Figure 8:
FIG. 8 depicts an example of locations used to refine search results over a social network.

In some embodiments, social media content collection engine 102 enables the user to filter the search results based on the originating locations of the citations/posts/Tweets. Here, the filtering location can be specified at the country, state, county, or city level. Additionally, the filtering location can be specified by latitude and longitude coordinates as shown by the example depicted in FIG. 8.

Figure 9:
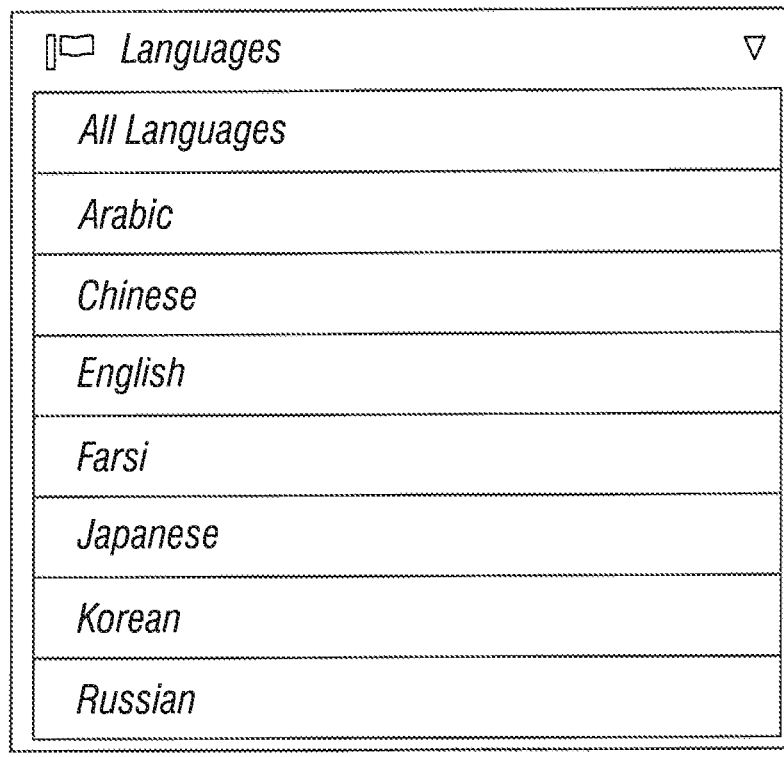
FIG. 9 depicts an example of language options used to refine search results over a social network.

In some embodiments, social media content collection engine 102 searches and returns search results for social media content in any language regardless of character set. Since social media content collection engine 102 matches the content items based on literal keywords, the user can enter any word from a foreign language and social media content collection engine 102 will return exact matches for the words entered. In addition, social media content collection engine 102 uses various methods of language morphology (e.g., tokenization) to isolate search results to just the language specified for a specific set of languages, which include but are not limited to English, Japanese, Korean, Chinese, Arabic, Farsi and Russian as shown by the example depicted in FIG. 9.

In some embodiments, social media content collection engine 102 adopts various language detection and processing techniques to filter the search results by language, wherein the language detection techniques include but are not limited to, tokenization, domain-specific handling, stemming and lemmatization. Here, the tokenization of the search results is language dependent. Specifically, whitespace and punctuation are delimited for European languages, Japanese is tokenized using grammatical hints to guess word boundaries, and other Asian languages are tokenized using overlapping n-grams. As referred to hereinafter, an n-gram is a contiguous sequence of n items/words from a given sequence of text or speech, which can be used by a probabilistic model for predicting the next item in such a sequence.

In some embodiments, social media content collection engine 102 uses character set processing as a first pass through character sets (e.g., Chinese, Japanese, Korean), while statistical models can be used to refine other languages (English, French, German, Turkish, Spanish, Portuguese, Russian), and n-grams be used for Arabic and Farsi. In some embodiments, domain-specific handling is utilized to identify and handle short strings and domain-specific features such as #hashtags, RT @replys for search results from social networks such as Twitter®. Stemming and lemmatization features are available for English and Russian languages.

In some embodiments, social media content collection engine 102 utilizes a user's historical comments/posts/citations to improve accuracy for language detection for search results. If the user is consistently identified as a user of one specific language upon examining his/her historical comments, future comments from that user will be tagged with that specific language, which largely eliminates false negatives for such user.

Figure 10:
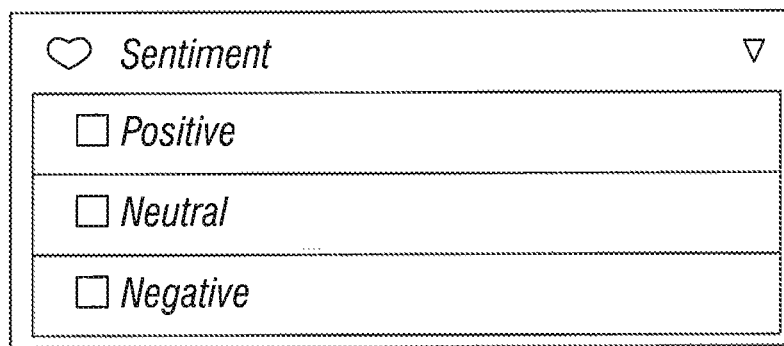
FIG. 10 depicts an example of sentiments used to refine search results over a social network.

In some embodiments, social media content collection engine 102 filters search results by whether the user/author sentiment of the content item collected is positive, neutral, or negative based on analysis of the posted English text as shown by the example depicted in FIG. 10. Specifically, social media content collection engine 102 uses a curated dictionary of sentiment weighted words and phrases to fine tune its sentiment detection techniques to handle content from a specific social network, such as Twitter's® unique 140 character limits and "twitterisms". By combining some English grammar rules to this, social media content collection engine 102 is able to accurately fine tune results in relatively high accuracy rates, with results typically garnering a 70% agreement rate with manually reviewed content. Social media content collection engine 102 is further able to identify and ignore entities with misleading names (e.g. Angry Birds) and applying stemming and lemmatization to expand the sentiment dictionary scope. Here, the curated dictionary of sentiment weighted words and phrases can grow organically based on real world data as more and more search results are generated and grammar rules found to be significant in helping to determine sentiment are included. For a non-limiting example, the use of the word "not" before a word is used as a negativity rule. In Addition, since stemming can introduce errors in categorization of sentiment (example, the root by itself could have negative sentiment but root+suffix could have positive sentiment), such stemming errors are handled on a case by case basis by adding the improper sentiment categorization due to stemming as exceptions to the dictionary.

Figure 11:
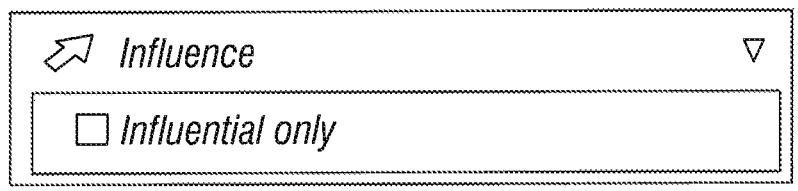
FIG. 11 depicts an example of user influence used to refine search results over a social network.

In some embodiments, social media content collection engine 102 filters search results to those authored by users determined to be influential only as shown by the example depicted in in FIG. 11. Here, influence level of an author measures the degree to which the author's citations/Tweets/ posts are likely to get attention from (e.g., actively cited by) other users, wherein various measures of the attention such as reposts and replies can be used. The influence level can be from a scale 0 to 10 and the influence filter will only return results from users who are "highly influential" (10) or "influential" (9). Such influence level can be determined based on a log scale so influence of a user has a very skewed distribution with the "average" influence level being set as 0. The influence measures are resistant to spamming, since an author cannot raise his or her influence just by having lots of followers, or by having a large value of some other easily inflatable metric. They must be other authors.

In some embodiments, social media content collection engine 102 calculates the influence level of a user transitively, i.e., the user's influence level is higher if he/she receives attention from other people with influence than if the user receives attention from users without influence. For a non-limiting example, the politicians as identified by their social media source IDs (e.g., "barackobama") will frequently have high influence because they are mentioned by many influential users, including news organization. Likewise many celebrities (e.g., "justinbieber") have high influence since they are frequently mentioned by other influential users. In some embodiments, social media content collection engine 102 utilizes a decay factor, so that an account of a user which is inactive—and which therefore no other user is mentioning—will fall to the bottom of the influence ranking, as will an account from spammers or celebrities who do not post things that other influential users find interesting.

Figure 12:
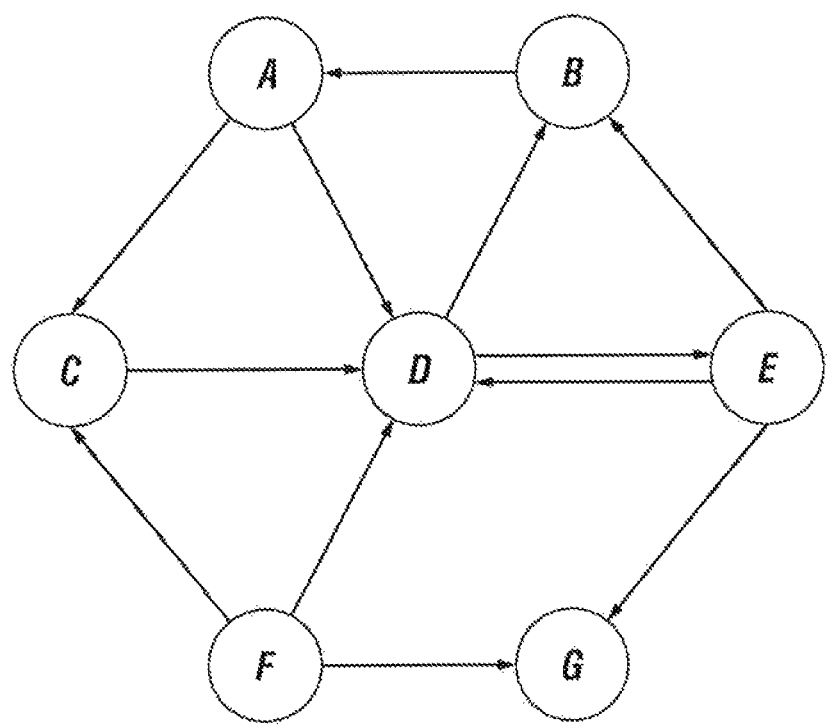
FIG. 12 depicts an example of an attention diagram used to measure user influence over a social network.

In some embodiments, social media content collection engine 102 adopts iterative influence calculation to handle the apparent circularity of the influence level (i.e., that an individual gains influence by receiving attention from other influential individuals) by measuring centrality of an attention graph/diagram. As shown in the example depicted in FIG. 12, every author is a node on the directed attention diagram, and attention (mentions, reposts) are edges. Centrality on this attention diagram measures the likelihood of a person receiving attention from any random point on the diagram. In the example of FIG. 12, Author F has reposted or mentioned Authors C,D, and G so there are outgoing line edges from F to these authors. Author D has received the most attention and is likely to be influential, especially if most of the authors mentioning or reposting Author D are influential.

Dashboard Presentation of Social Media Content

Figure 13:
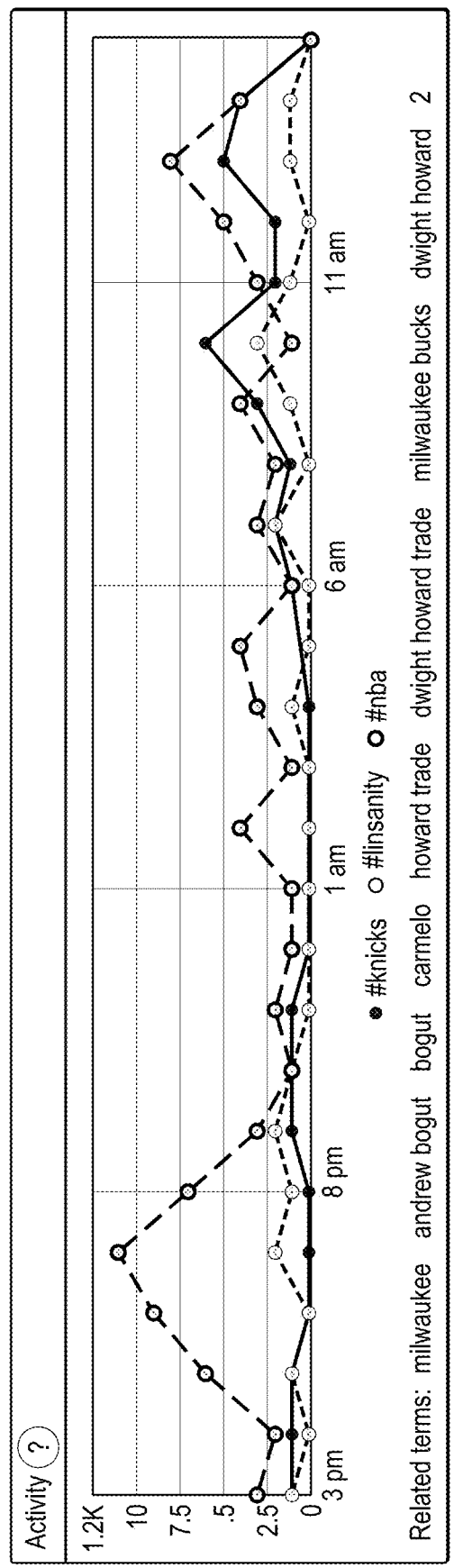
FIG. 13 depicts an example of an activity snapshot related to keywords mentioned over a period of time on a social network.

In the example of FIG. 2, social media content analysis engine 104 presents a dashboard that shows a quick snapshot of what is important for the given search keywords and parameters selected by the user. If nothing is selected the default is to show everything trending on the social network right now or for the past 24 hours. The content snapshots presented within the dashboard include one more of: Activity, Top Posts, Top Links, and Top Media and the user may navigate to the dedicated view of a specific snapshot of the content by clicking on the title of the content (e.g., clicking on Top Posts takes the user to the Trending Tab with Posts selected). Specifically, Activity snapshot shows the number of mentions for the top five (if more than five keywords are entered) most active keywords entered in the search box as shown by the example depicted in FIG. 13. As shown in FIG. 13, the data displayed represent the number of total mentions for each keyword within the time range selected, as well as the most related terms to the target keyword(s) selected within the time range specified.

Figure 14:
FIG. 14 depicts an example of a snapshot of top posts related to keywords mentioned on a social network.

Top Posts snapshot shows the top four significant posts for the keywords entered along with their number of mentions. The posts are ranked by relevance so the most important posts are displayed as shown by the example depicted in FIG. 14. If a number of keywords are entered, then the posts are compared against each other to determine which posts from which keywords are displayed. The social media content analysis engine 104 attempts to display at least one post from each keyword if there are less than four keywords entered.

Top Links snapshot shows the top six trending links for the keywords entered along with their number of mentions as shown by the example depicted in FIG. 15.

Figure 16:
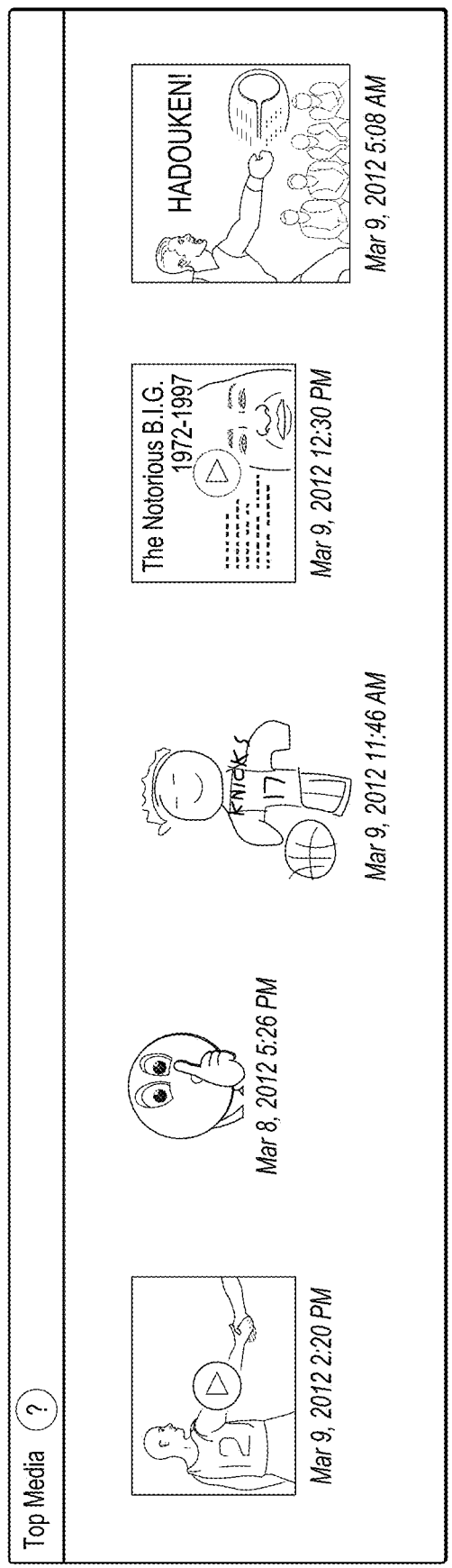
FIG. 16 depicts an example of a snapshot of top media related to keywords mentioned on a social network.

Top Media snapshot shows the top trending videos and photos for the keywords entered as shown by the example depicted in FIG. 16.

Activity History Over Social Network

In some embodiments, social media content analysis engine 104 provides activity history view that displays the volume of mentions for a set of keywords over a period of time. Social media content analysis engine 104 provides the user with the ability to select the start and end dates for displaying mention metrics within the view/report. It also enables the user to specify the time windows to display, including by month, week, hour, and minute. Such a view/report is useful for examining historical events and identifying patterns. For non-limiting examples, such report can be used to:

Track the number of mentions of the leading US Presidential contenders (Obama, Romney, Gingrich, and Santorum) over the past six months.

Track the number of negative sentiment mentions for the President using the following keywords: Obama, #obama, President Obama, @barackobama, and @whitehouse based on the following locations: in Egypt, Libya, Syria, Lebanon, Israel, and Iraq.

Track the number mentions in Chinese of Foxconn in China, Hong Kong, Taiwan.

Track the number of hashtags representing Syrian cities over time, isolating the mention activity to Arabic language.

In some embodiments, social media content analysis engine 104 makes the activity history data available for presentation in real time on a rolling basis. Specifically, minute metrics are available for the last 6-8 hours on a rolling basis, hour metrics are available for last 30 days on a rolling basis, and daily metrics are available at least 6 months back.

Figure 17:
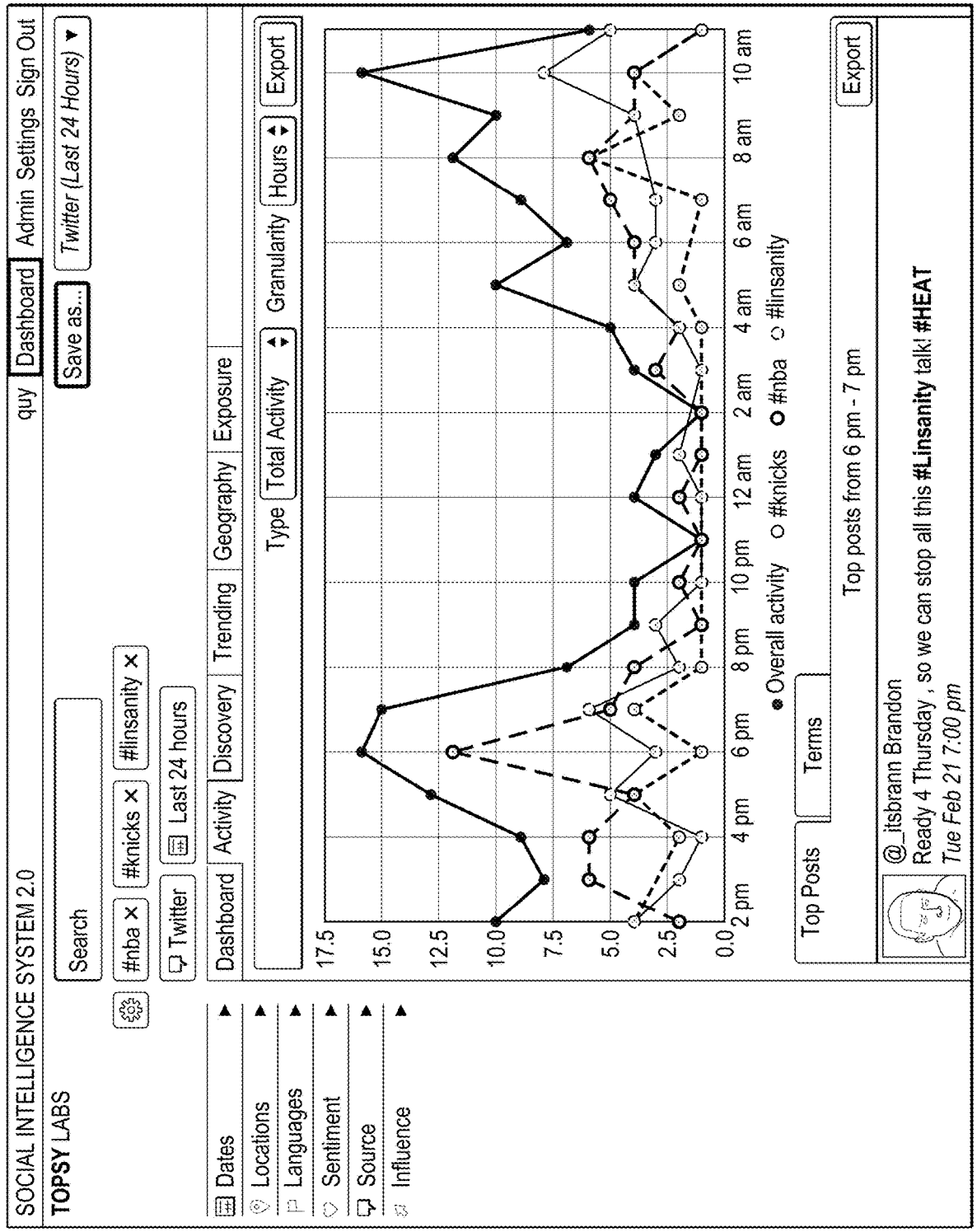
FIG. 17 depicts an example of a snapshot of activities associated with keywords over a period of time on a social network.

In some embodiments, social media content analysis engine 104 allows the user to enable and disable the keywords and their associated lines on the figure by clicking on the keywords below the figure as shown by the example depicted in FIG. 17. This is a very useful feature when a number of keywords are graphed, with a few "flooding out" the others due to high volume. Removing these higher volume keywords by simply clicking on them enables the user to "peel back" layers of smaller volume lines to identify what activity may be important over time.

Figure 18:
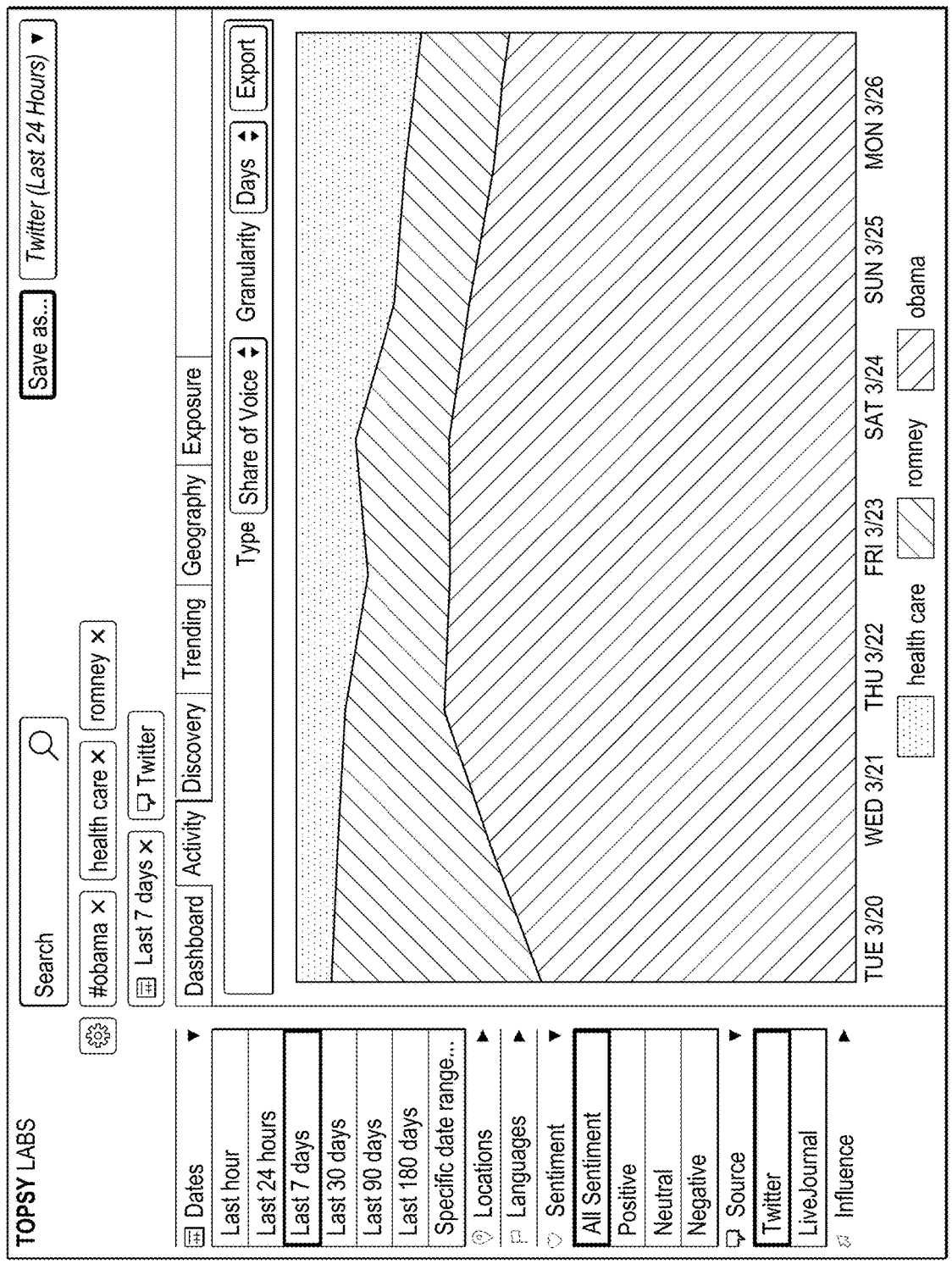
FIG. 18 depicts an example of share of voice (SOV) analysis of activities over a period of time on a social network.

In some embodiments, social media content analysis engine 104 supports Share of Voice (SOV) analysis, which is used to measure the relative change in mention activity for a given group of keywords over time as shown by the example depicted in FIG. 18. SOV analysis calculates the total number of mentions for a keyword and divides the number of mentions for a keyword by the summed amount of mentions for the group of keywords being analyzed so the relative percentage of each keyword's mentions over time can be analyzed. The metrics used in a SOV analysis could also be scoped for a specific language, social data source or geographic area. This is a useful technique for measuring the relative importance of something being mentioned on the social web over time within a given category of related keywords or phrases and other parameters.

Figure 19:
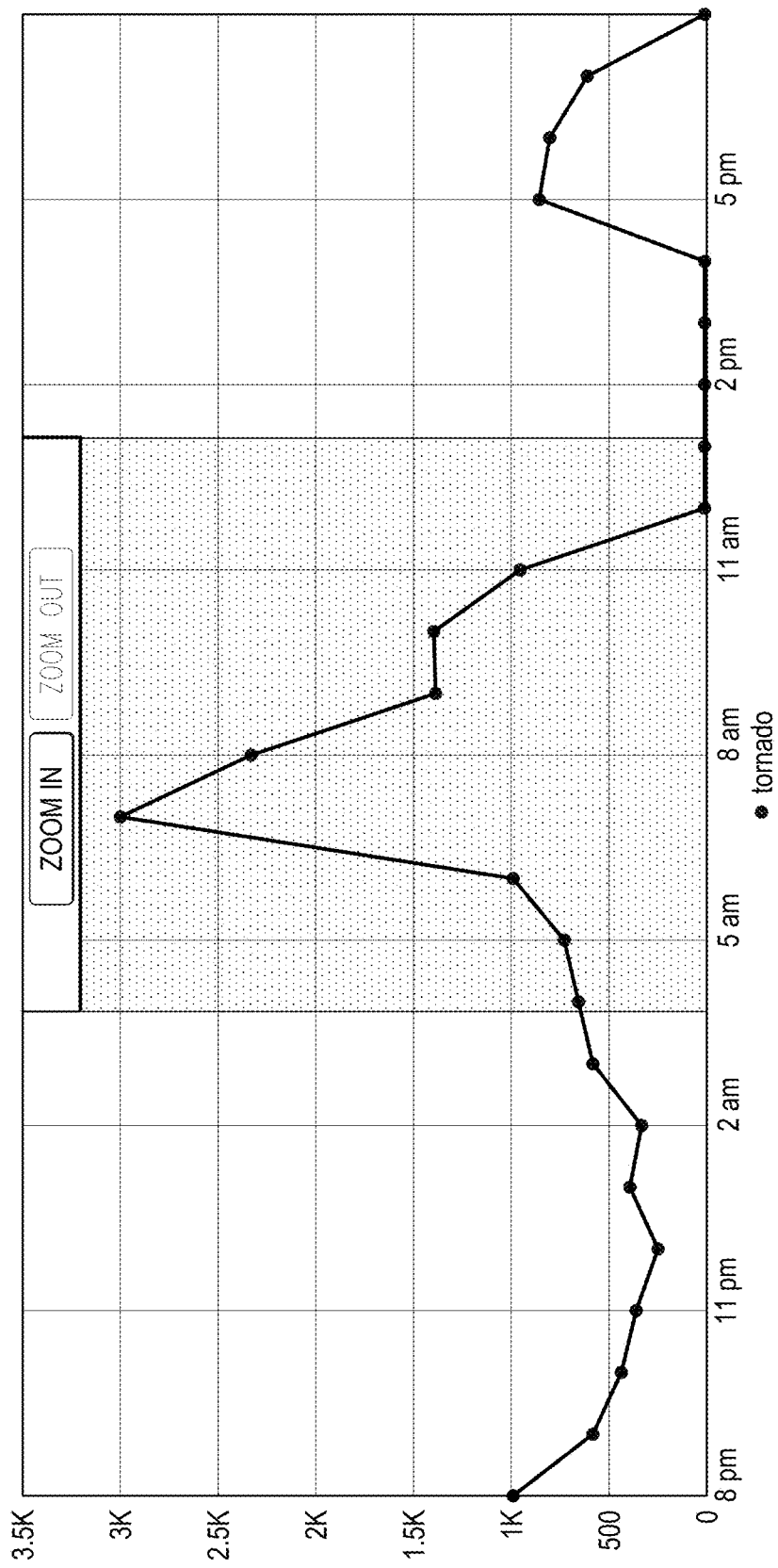
FIG. 19 depicts an example of zooming in and out on activities over a period of time on a social network.

In some embodiments, social media content analysis engine 104 enables the user to select a time slice window for the date range requested whether that is by minutes, hours, day, week, or month and to zoom in and out on a specific region of the activity diagram by clicking a region and then holding down the click until identified the region to zoom into has been selected (click & drag to select). This allows the user to quickly and easily change the range to see the time frame that is relevant to his/her analysis as shown by the example depicted in FIG. 19.

In some embodiments, social media content analysis engine 104 enables the user to select and view the Top Posts with a specific time range selected. If a specific point on the activity diagram is selected, then the Top Posts are from just that date and keyword selected. For a non-limiting example, if the top peak of the dark green line was selected, the top posts for #NBA at 6 PM will be shown by the example depicted in FIG. 20. Here, the Tops Posts shows the top significant posts (posts that contain a link or are re-posted) for that specific day and do not necessarily show all the posts for a given day.

Figure 21:
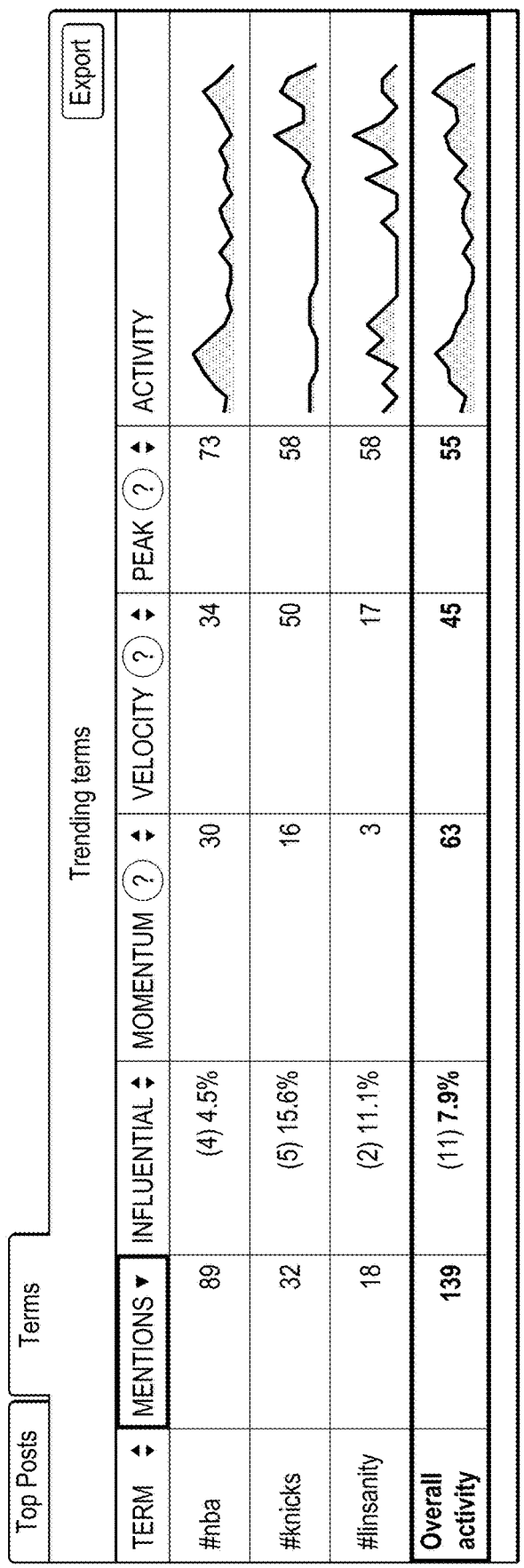
FIG. 21 depicts an example of viewing of keywords/terms mentioned over a period of time on a social network.

In some embodiments, social media content analysis engine 104 a list of the most recent trending metrics for the specified saved search group or keywords/terms entered/ mentioned by social media content items. Each term will include the following metrics: mentions, percent influence, momentum, velocity, peak period as shown by the example depicted in FIG. 21. Users can view these metrics so they can quickly identify what terms have the highest mention volume, are trending the most via momentum, or are peaking most recently via peak period metrics.

Discovery of Related Terms

In some embodiments, social media content analysis engine 104 enables the dynamic discovery of new terms that are related to existing known keywords submitted for a query search over a social network. Such discovery presents the user with a list of top keywords (e.g., individual words, hashtags or phrases in any language) related to and/or co-occurring the one(s) entered by the user and trending (currently or over a period of time) over the social network based on various measurements that that measure the trending characteristics of the terms in the social media content items collected over a period of time. For non-limiting examples, such measurements include but are not limited to mentions, influence, velocity, peak, and momentum, which can be calculated by the social media content analysis engine 104 based on all citations/tweets/posts containing the search keywords AND the discovered related terms. This list of related words/terms enables the user to see what terms are related to known terms submitted, the strength of their relationships and the extent to which each of the related terms are trending within the time range selected. For a non-limiting example, different trending terms co-occurring and related to the search term "Republican" (e.g., Gingrich, Romney, Ryan, etc.) can be discovered over different phrases of the 2012 presidential campaign cycle, which can then be used to search for most relevant social media content items within the relevant time periods.

For non-limiting examples, the related terms discovered by social media content analysis engine 104 enables the user to:

Determine the top trending keywords/events/people/hashtags that the user does not know about for a known list of keywords.

Discover what terms are most highly correlated to keywords now, 6 weeks ago, or even 6 months ago. The related discovery terms are determined based on the time range selected so analysis can be done to see how terms change over time.

Identify keywords related to single known term, building awareness based upon the knowledge gleaned from discovering new terms.

Quantify what terms are most related, and have the highest volume or most recent peaks based upon analysis of the metrics.

In some embodiments, social media content analysis engine 104 discovers the related terms by examining a historical archive of recent tweets/posts retrieved from the social network for top trending terms co-occurring with the submitted keywords before searching over the social network. The discovered related terms can then be used together with the keyword(s) submitted by the user to search for the relevant content items in the social media content stream retrieved continuously in real time from the social media network via a social media source fire hose. Alternatively, social media content analysis engine 104 may dynamically discover the related terms by examining the social media content stream in real time as they are being retrieved and apply the related terms discovered to search for relevant social media content items together with the user-submitted keyword(s).

In some embodiments, social media content analysis engine 104 discovers the related terms via a significant post index, which includes citations/posts that contain a link or a re-post to another content item. Social media content analysis engine 104 then applies a weighted frequency analysis to the significant posts containing the submitted keywords and the related terms to discover the related terms within the date range selected.

In some embodiments, social media content analysis engine 104 discovers and/or sorts the list of related terms based on a combination of one or more of:

Unexpected, where weight is given to the terms that are uncommon in the general search, which means the daily-scale document frequency is low, i.e. a result term that has not been mentioned a lot in the last few days. For a non-limiting example, if both "foreign ministers" and "vehicles" are appearing for query "syria" and have equal levels of co-occurrence with the query (same number of tweets in last few hours containing both "syria" and "foreign ministers" as the number of tweets containing both "syria" and "vehicles"), then "foreign ministers" is likely to rank higher because "vehicles" is a more common term and is used more often in other contexts (as measured over the last few days).

Contemporaneous, where weight is given to terms whose rate of co-occurrence with the keywords submitted has increased significantly in a short period of time. The discovered terms become available in real-time and it is possible to query historical time intervals. The metrics used to track increases for the terms over time is gathered in a counting bloom filter fed by search index of significant tweets/posts. For each term and term-pair, social media content analysis engine 104 keeps an estimate of the frequency on both an hourly and daily scale. From this the social media content analysis engine 104 computes an estimate of the velocity and momentum whenever the velocity and momentum exceed certain thresholds it emits a term pair. It should be possible to identify the related terms with spikes or rises in the standard metrics Meaningful, where phrases are filtered for quality against Wikipedia, Freebase, and other open databases, as well as the query logs of the social media content collection engine 102. Weight is given to the terms whose absolute rate of co-occurrence with the query is larger than others.

Intentional, where a bonus or weight is given to hashtags because they suggest an intent to query.

In some embodiments, social media content analysis engine 104 also discovers and/or sorts the related terms based on one or more of: momentum, velocity, peak and influential metrics in addition to correlation scores and mentions (e.g., total number of mentions/re-tweets for this post, link, image or video over its lifetime) for each of the related terms. The following metrics are based on the timeframe set by the user in the search parameters and are calculated off of a census-based post index for all posts:

Momentum, which measures the combined popularity of a term and the speed at which that popularity is increasing. A high score indicates that there have been more frequent recent citations/posts relative to historical post activity. Terms with high momentum scores typically have high levels of post volume. For a non-limiting example, momentum for the past 24 hours can be calculated as: momentum=sum of (h/24*count_of[h]), where h is the hour, from 1 to 24, 24 being the most recent hour.

Velocity, which solely measures the speed at which a term's popularity is increasing, independent of the term's overall popularity. Velocity numbers can be in the range of 0-100. If the time window is 24 hours, then 100 means that all volume over that time period selected happened within the past hour. The difference between momentum and velocity is that velocity only measures speed while momentum measures both speed and popularity (volume of mentions). For a non-limiting example, velocity over the past hour can be calculated as: velocity=(100*momentum)/mass, where h is the hour, from 1 to 24, 24 being the most recent hour, and mass is sum of count_of[h]—i.e. just the total count over the 24 hour period.

Peak, which indicates the time period that had the highest number of content items containing the terms over the time period selected. The unit is calculated based on the date range selected, including 24 hours (unit of measure is hours), 7 days (unit of measure is days), 30 days (unit of measure is days), 90 days (unit of measure 180 days (unit of measure is weeks), and specific date range, where unit of measure is calculated based on the time frame that is entered. If the specified date range is less than a year, then the above unit measurements are utilized. If the date range is longer than a year then the peak period is based on a time slice out of 52 across the time period.

Influence, which measures the total number of influential mentions/retweets of a content item (e.g., post, link, image or video) containing the terms over the lifetime of the content item. Social media content analysis engine 104 counts influential mentions for a link as the total number of tweets that have contained the link from influential users. For a non-limiting example, an influential count of 5 could mean that there were 5 different tweets from 5 different influential users or 5 tweets containing the link from one influential user.

Figure 22:
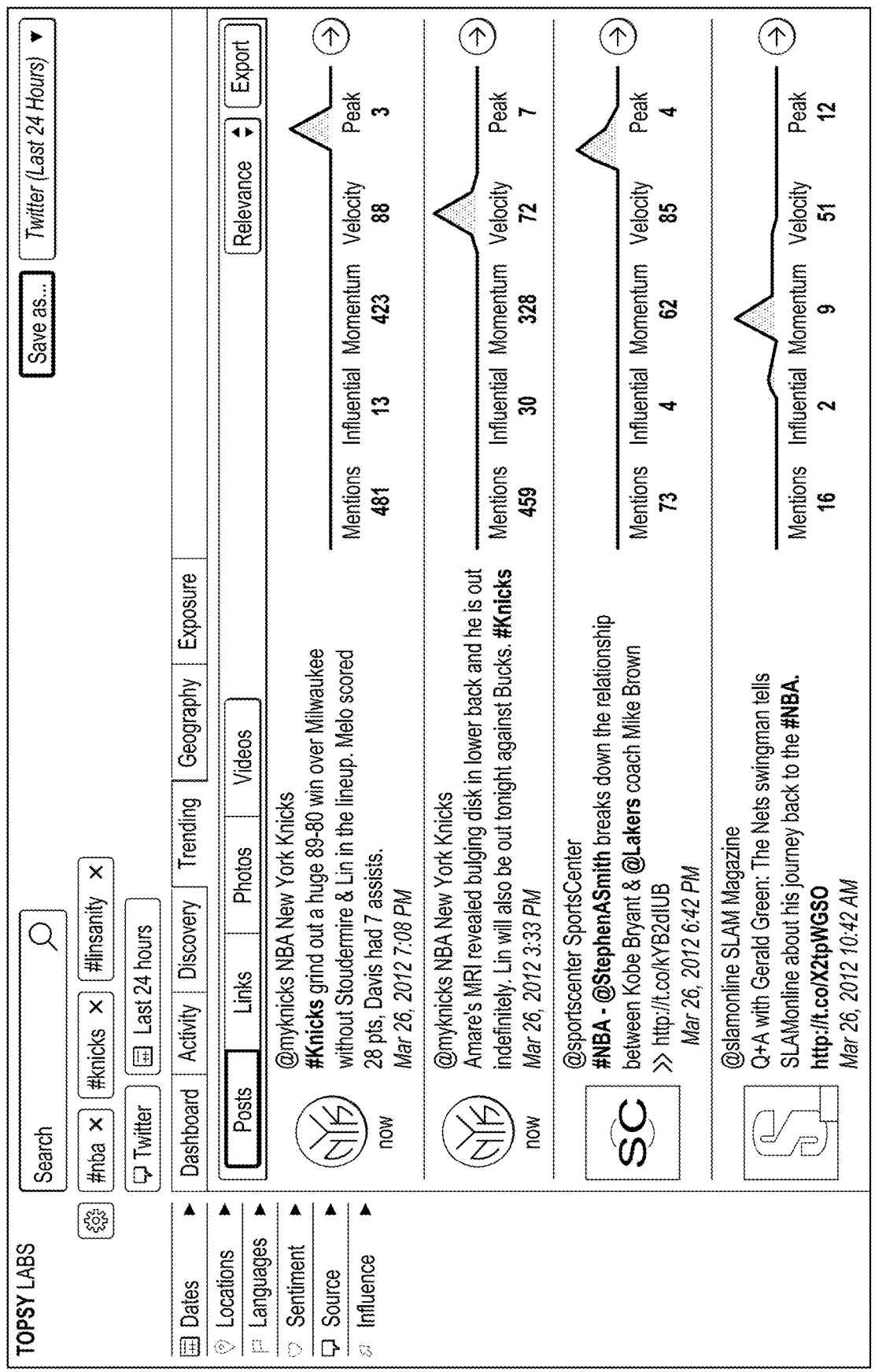
FIG. 22 depicts an example of content items related to discovered terms over a period of time on a social network.

In some embodiments, once the terms related to the set of keywords have been discovered, social media content analysis engine 104 utilizes both to search the social network for the content items (citations, tweets, comments, posts, etc.) containing all or most of the keywords plus the related terms. For a non-limiting example, the top posts found by search via the target/submitted search term and the discovered related term as shown by the example depicted in FIG. 22. In some embodiments, where there may not be a comment that has all the terms, social media content analysis engine 104 attempts to determines the top content items that contains as much of the keywords, including the related term as possible. Consequently, one post/content item may appear for every related term in the search results.

Trending

In some embodiments, social media content analysis engine 104 presents the top trending results for posts, links, photos, and videos sorted by one or more of: relevance, date, momentum, velocity, and peak based upon the time frame selected. It is important to note that all these metrics are always scopes to the post, link, photo or video displayed—not the aggregate number of posts for a given keyword. The social media content analysis engine 104 identifies the most significant posts which were mentioned within the time range selected, with variations in the metrics presented that are important to note. In addition, for all the time ranges from x-date to present (e.g., past 24 hours, past 7 days), the mention and influential mentions are calculated based on the number of all-time mentions. If a specific time slice is selected (e.g., Jan. 1, 2012 to Jan. 31, 2012) then the mention and influence metrics are also scoped to all time and not to just the timeframe specified.

Figure 23:
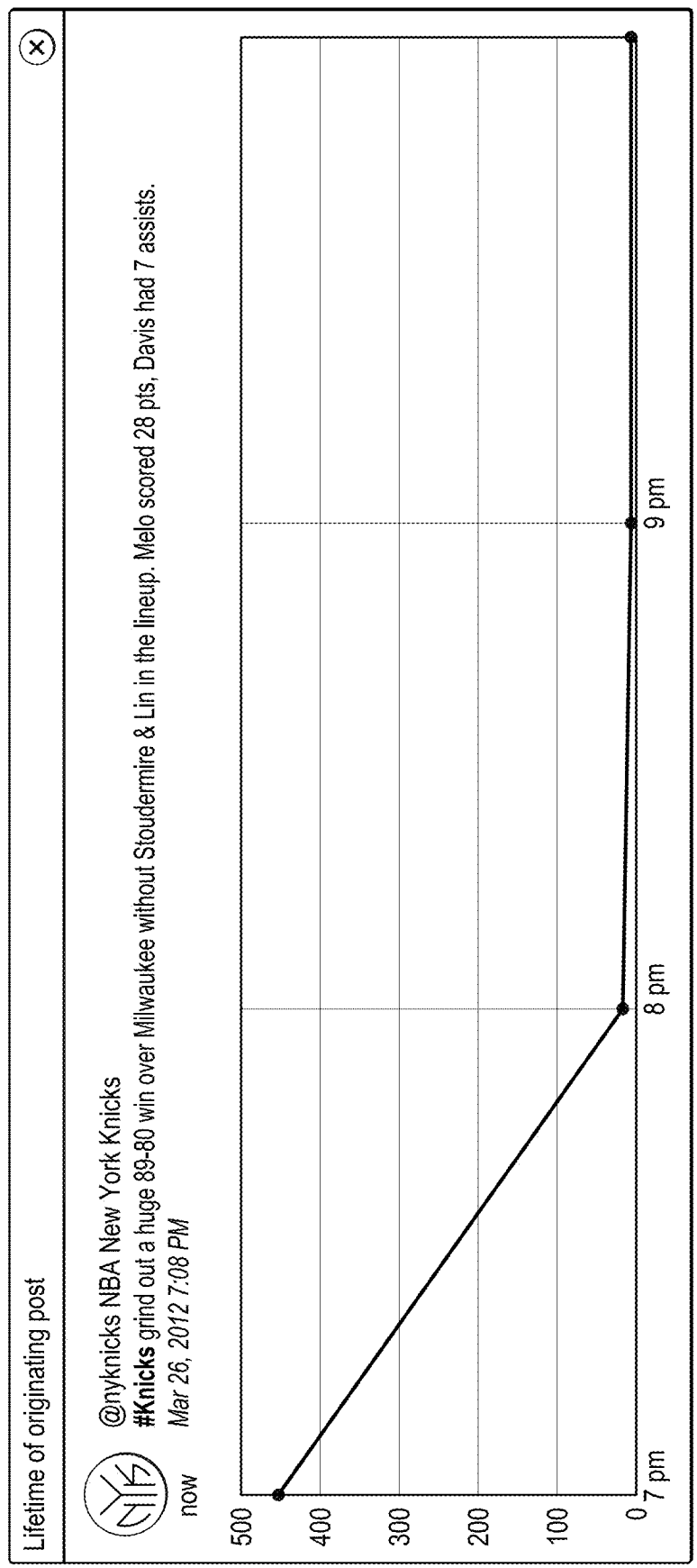
FIG. 23 depicts an example of top trending posts over a period of time on a social network.
Figure 24:
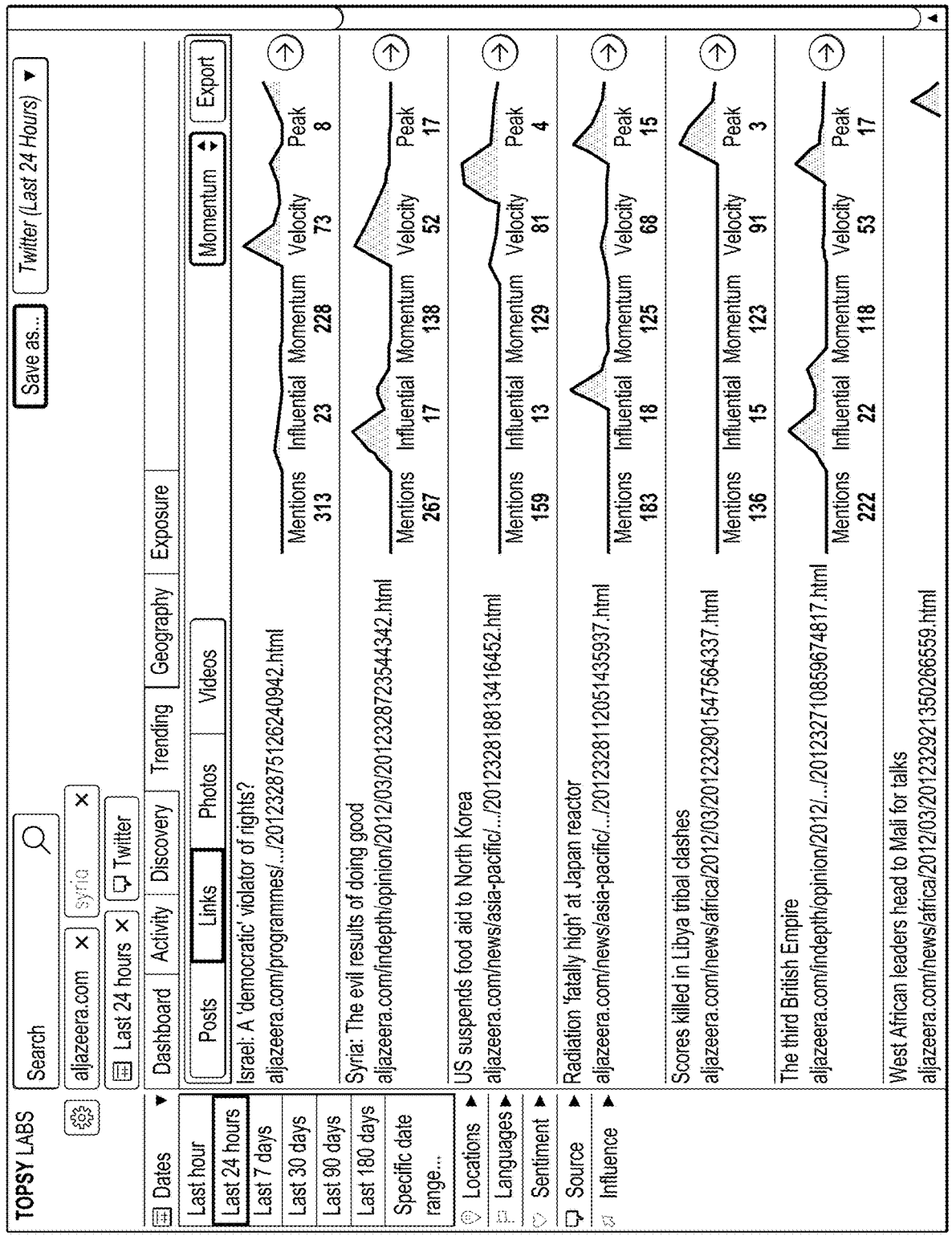
FIG. 24 depicts an example of the activities of a post over its lifetime on a social network.

In some embodiments, social media content analysis engine 104 presents the trending top posts for the keywords and parameters specified, where the view displays the actual post, along with the author of the post, a timestamp of when the post was originally communicated, and the corresponding mention, influential (number of influential mentions), momentum, velocity, and peak metrics. In addition, the profile information of the user on the social network (e.g., Twitter® is displayed (name, link, bio, latest post, number of posts, number they are following, and number of followers) by highlighting the picture associated with the user's login name on the social network. The user is also enabled to click on the arrows on the right side of the spark line diagram for each post from the view depicted in FIG. 23, which displays the overall activity of that specific post for the lifetime of the post as shown in the example depicted in FIG. 24.

In some embodiments, social media content analysis engine 104 presents the trending links, where the view displays the most popular links matching any set of keywords, including domains. By specifying only domains as keywords (e.g., "nytimes.com"), the trending links view returns the most popular links on a specific domain/website (e.g., washingtonpost.com, espn.com) or across the multiple domains entered. For each domain specified, social media content analysis engine 104 will display one or more of the following metrics: mentions, percent influence, momentum, velocity, peak period.

Figure 25:
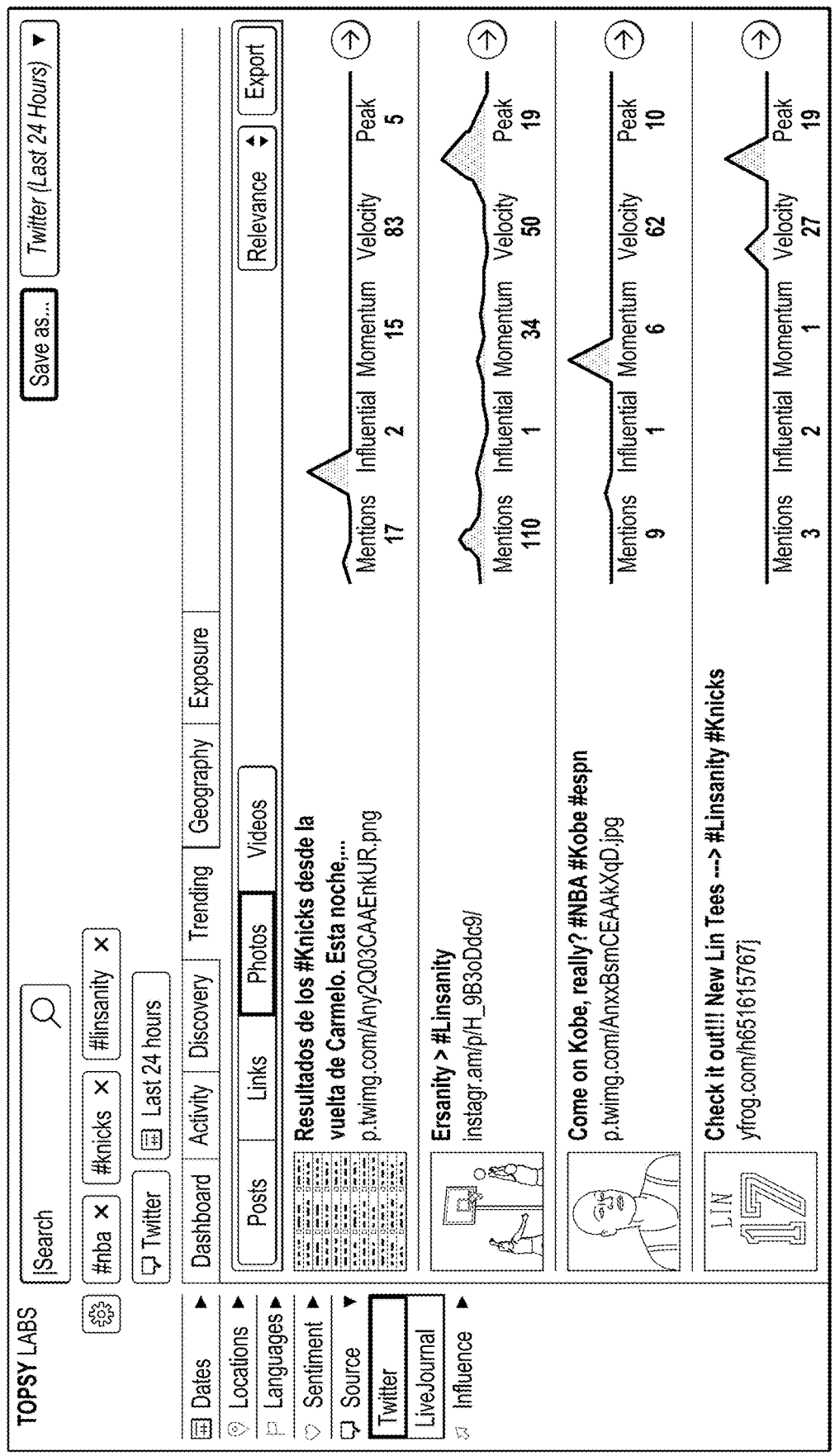
FIG. 25 depicts an example of top trending links over a period of time on a social network.

In some embodiments, social media content analysis engine 104 enables the user to input multiple domains for domain analysis in order to quickly identify what links these domains have the highest mention volume, momentum, velocity or are peaking most recently via peak period metrics as shown in the example depicted in FIG. 25. Such analysis identifies what articles/links are most popular on any domain consumers are referencing within the social network (e.g., Twitter®). For non-limiting examples, such analysis can be utilized to:

Analyze which stories have just broken and are the most popular over the past 24 hours on aljazeera.com.

View what news stories are trending about keyword "Syria".

View what news stories on wsj.com and nytimes.com have the highest volume of mentions or percentage of influencers over the past 24 hours.

Compare which news stories/links have the highest momentum between the New York Times (nytimes.com) and the Washington Post (washingtonpost.com).

Isolate what links are trending the most within a country by only selecting country and not specifying anything else.

Figure 26:
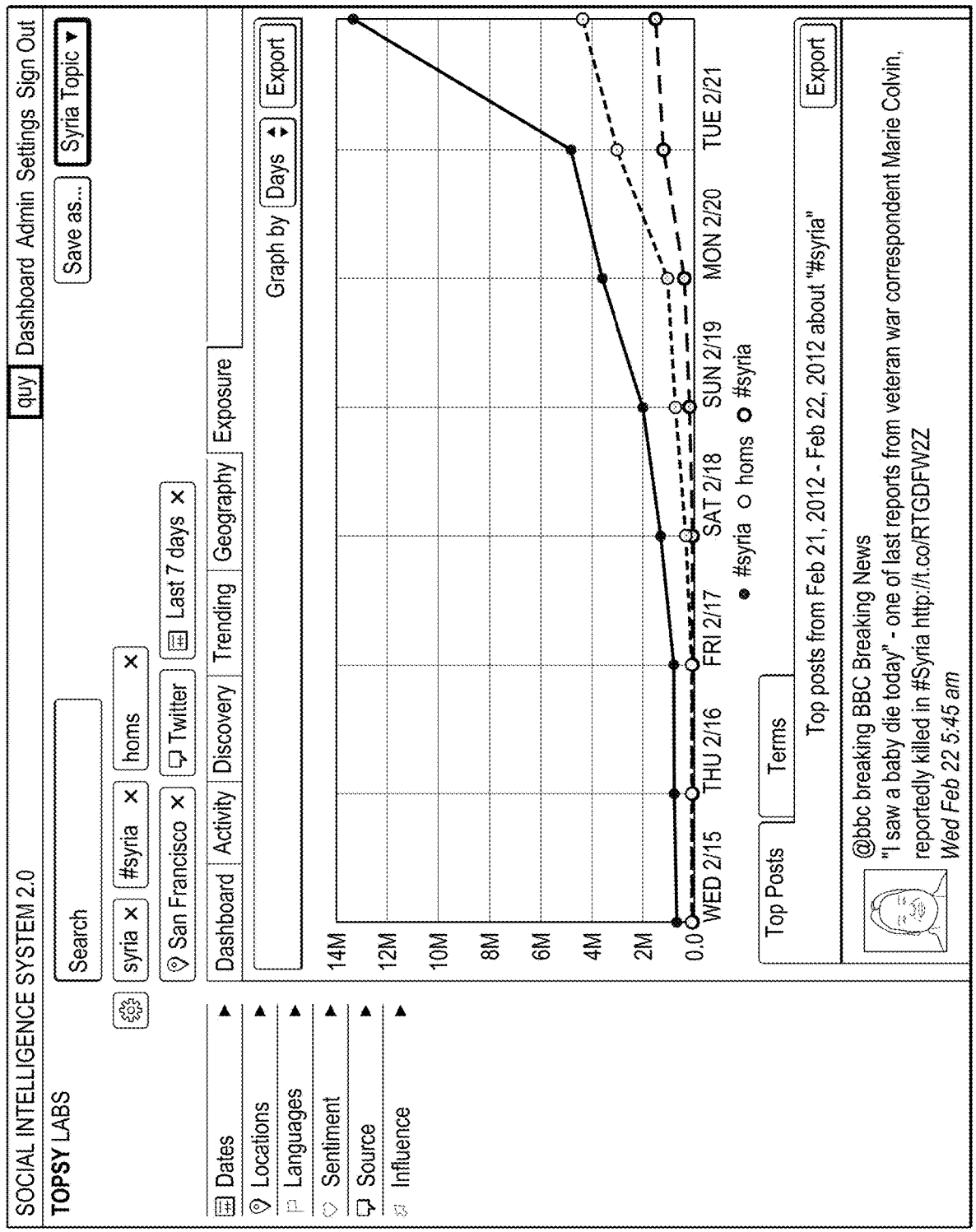
FIG. 26 depicts an example of top trending media over a period of time on a social network.

In some embodiments, social media content analysis engine 104 presents the top trending media (photos and videos) related to the keywords and parameters entered. The results presented can be sorted by one or more of relevance, date, momentum, velocity, and peak as shown by the example depicted in FIG. 26. Displayed along with the top photo, which can be shared on the social network (e.g., Twitter® from a variety of photo sharing sites (e.g., twitpic, yfrog, instagr.am, twimg), are the number of mentions containing the photo link, number of influential people that posted the link, and the momentum, velocity, and peak score. In some embodiments, a spark line is displayed in order to quickly determine what photo is trending or stale. The view of trending photos is very useful for identifying photos associated with events as they unfold. Such view can be used to find photos from individuals on the ground before media outlets pick them up. Users can also isolate what photos are trending the most within a country by only selecting country and not specifying anything else.

In some embodiments, social media content analysis engine 104 presents the top trending videos related to the keywords and parameters entered. The results presented can be sorted by one or more of relevance, date, momentum, velocity, and peak. Displayed along with the top video, which is shared on the social network (e.g., Twitter® from a variety of video sharing sites are the number of mentions containing the video link, number of influential people that posted it, and the momentum, velocity, and peak score. In some embodiments, a spark line is displayed to quickly determine what video is taking off (i.e., trending) or stale. The view of trending videos is very useful for identifying videos associated with events as they unfold. Such view can be used to find videos from individuals on the ground before media outlets pick them up. Users can also isolate what videos are trending the most within a country by only selecting country and not specifying anything else.

In some embodiments, social media content analysis engine 104 presents the trending terms report, which provides a list of the most recent trending metrics for the specified saved search group or keywords entered. Each term may include one or more of the following metrics: mentions, percent influence, momentum, velocity, peak period. Users can view these metrics to quickly identify what terms have the highest mention volume, are trending the most via momentum, or are peaking most recently via peak period metrics.

Exposure

In some embodiments, social media content analysis engine 104 presents the a cumulative exposure view of the search results, which returns the gross cumulative exposure for posts containing a set of keywords over time. This analysis is useful to measure the gross exposure over time from posts matching a target set of keywords. For non-limiting examples, such cumulative exposure view can be used to:

View the number of cumulative gross impressions of a specific post, such as a speech delivered by President Obama's Middle East speech (#mespeech) in Libya, Syria, and Egypt for the 24 hours after he delivered the speech.

View the cumulative negative sentiment exposure of a hot topic with certain time frame, such as #debtcrisis for the first week of September 2011.

View the cumulative exposure of the keywords referring to a specific person over a period of time, such as Medvedev, #medvedev, and @medvedevrussia in Russian in the US and Russia over the past 30 days.

Identify "tipping points" in when gross exposure significantly increased for a given set of terms over time.

Figure 27:
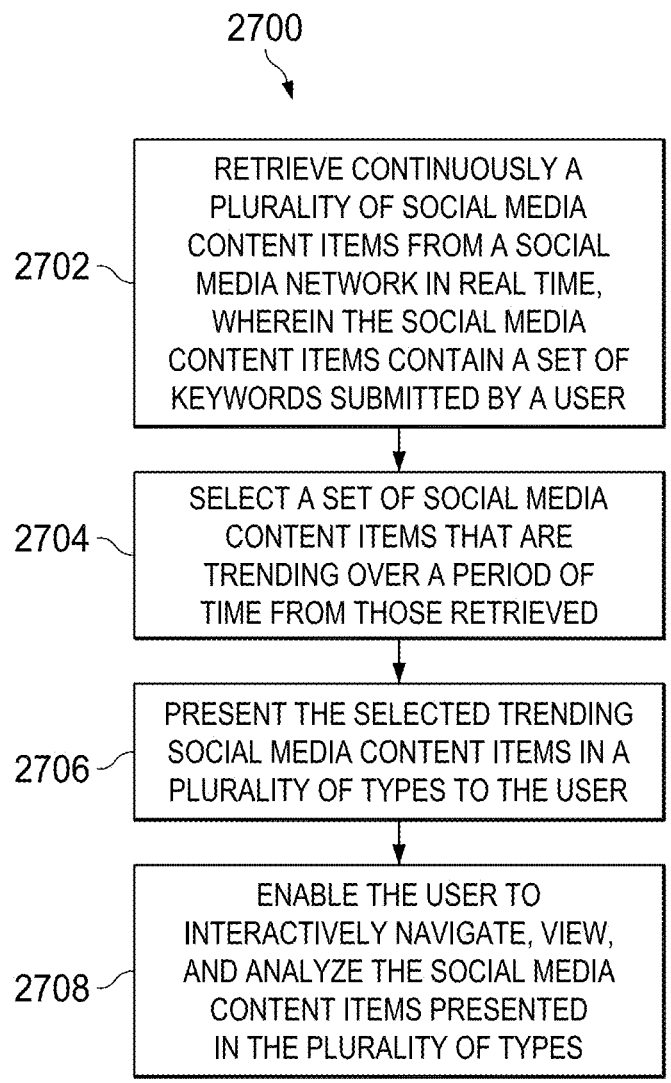
FIG. 27 depicts an example of a view of cumulative exposure of a post over a period of time on a social network.

In some embodiments, social media content analysis engine 104 calculates the cumulative exposure by summing the follower counts of all the authors of the posts that match the keywords being queried. This calculation returns overall gross exposure (vs. unduplicated net exposure) so multiple posts from the same author or authors with common followers may result in audience duplication as shown by the example depicted in FIG. 27.

In some embodiments, social media content analysis engine 104 displays top significant posts in the cumulative exposure view for the time range selected in the search parameters. If a specific point on the exposure view is selected then the top posts are from just that date and keyword selected. For a non-limiting example, in the example depicted in FIG. 27, if the dot on the line for the date February 21 is selected then the top significant posts for Syria will be shown on that date.

Cross Network ID

In some embodiments, social media content analysis engine 104 supports cross network identification to identify an author and to view the content produced by the same user across different social networks, such as between Twitter® and Blogs, or a review site and a chat site analysts. Specifically, social media content analysis engine 104 compares the user profile photos and/or content of the posts from different sources of social media content and analyzes if the author is the same on those sources. If the same author is identified, social media content analysis engine 104 may assign a common cross network identification to the user. Social media content analysis engine 104 may further present the user's posts over the different social media sources/social networks side-by-side on the same display in such way to enable a viewer to easily toggle between the different social networks to compare the posts by the same user.

Media Identification

In some embodiments, social media content analysis engine 104 supports media identification to classify individual authors of social media content items from commercial and news sources. By filtering out commercial and news sources, social media content analysis engine 104 is able to generates reports focused on individuals "on the ground".

In some embodiments, social media content analysis engine 104 uses a combination of a whitelist and a trained classifier to assign users as a media or non-media type. For a non-limiting example, the whitelist can initially be derived from the public list of social media sources lists and their respective verified accounts and grown organically on an ongoing basis.

Figure 28:
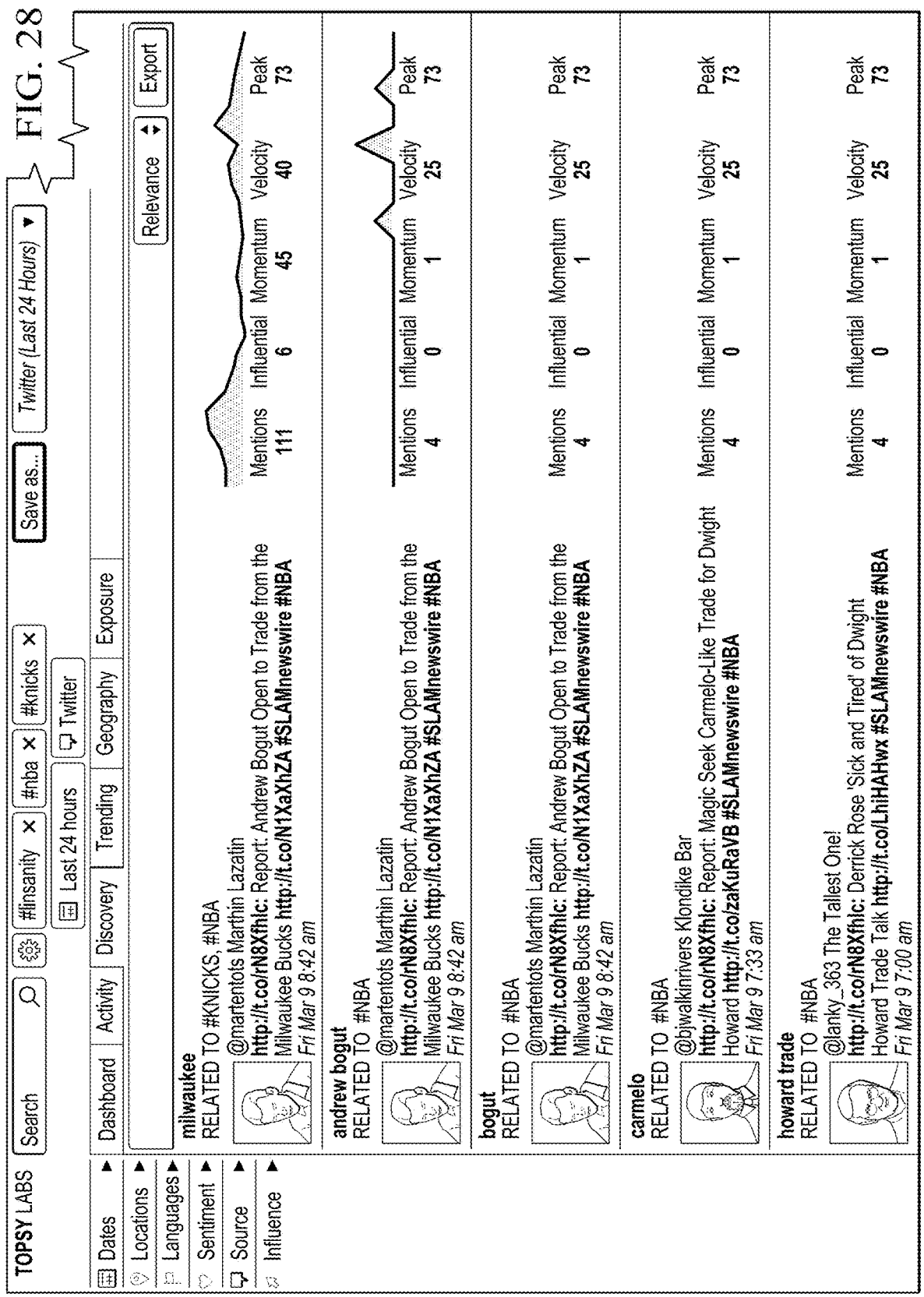
FIG. 28 depicts an example of a view of social media content items displayed over a set of geographic locations on a map.

In some embodiments, social media content analysis engine 104 may review the user's profile and historical post information to intelligently identify media/news sources the user belongs to. Some of the attributes and features of the user's information being reviewed by social media content analysis engine 104 include but are not limited to:

Total number of posts
Total number of reposts
Percentage of posts that have links
Percentage of posts that are @replies
Total number of distinct domains from links posted
Average daily post count
Similarities to other media accounts
Profile URL matches a media site
Profile name of user matches a media name or a real human name Geography In some embodiments, social media content analysis engine 104 supports geographic analysis, which returns/presents a view/report on at least some of the social media content items (social mentions) with a set of known geographic locations over a period of time as shown by the example depicted in FIG. 28. Here, the geographic locations refer to places where posts are originating from, and can be defined by city, county, state, and countries. For non-US countries, "state" and "county" correspond to administrative division levels. This report can be displayed on a world map with shading indicating the relative volume of mentions at their geographic locations on the map, wherein the world map can be zoomed in to focus on the social mentions at a region or a country and enables the user to drill-down to see the social mentions at country, state, county, or city level. In some embodiments, the geographic analysis report shows country-level metrics at a high confidence and coverage rates. For a non-limiting example, a confidence rate of 90% means that 90% of posts that are geo-tagged at the country level are correct based on validation methods.

In some embodiments, social media content analysis engine 104 shades the world map based on a polynomial function that colors the map by default based on the raw volume of mentions per geographic location. If the Activity table is re-sorted by "% Activity", then the world map is refreshed and shaded based on the relative percentage activity for each country. When the shaded location (the one selected as part of the report parameters) is rolled over, the volume metrics and percent activity are displayed. The table below the map allows the user to see mention and percent metrics for each geographic area. Here, the "% Activity" metrics are defined as the mentions matching the entered keywords divided by total overall mentions for the geographic area. In some embodiments, social media content analysis engine 104 may calculate the "% Activity" metric by taking the total posts for the keywords entered divided by the total number of all posts for that country, basically calculating a share of voice percentage. For a non-limiting example, a 3.1% activity means that 3.1% of tweets found for that country contain the keywords entered during the timeframe specified. In some embodiments, social media content analysis engine 104 enables the user to display metrics by specifying either latitude/longitude or not, in which case metrics will be calculated based upon the system's inferred geo location.

GeoTagging Methodology

In the example of FIG. 2, social media geo tagging engine 106 identifies and marks each social media content item with proper geographic location (geo location or geo tag) from which such content item is authored. In some embodiments, social media geo tagging engine 106 is able to identify geo-location of a social media content item using the latitude/longitude (lat/long) coordinates of the content item when the user/author of the content item opts in to share the GPS location of the digital device where the content item is originated. Lat/long is highly accurate for identifying (i.e., identifies with high confidence value) where the user is when he/she communicates via a mobile device but it may have very sparse coverage (generally 1-3% of the posts) depending on the query parameters used. Here confidence value is expressed as the probability that a post came from a specified location. In addition, social media geo tagging engine 106 provides geo trace scores to help identify the relative weight of the geo adaptations/features used to identify the location.

In some embodiments, social media geo tagging engine 106 may identify geo-location of a content item from the profile information of the author/user of the content item, wherein the user's profile contains the user's self-described geographic location. The data point in the user's profile identifies where the user may be (not where they are communicating from) with low confidence (because the information is self-described by the user him/herself) but with relatively high coverage (50-70%). Social media geo tagging engine 106 determines that the location identified in the user's profile is "valid" if the user with that location is generally telling the truth (e.g. people who claim to live in Antarctica are generally not telling the truth).

In some embodiments, social media geo tagging engine 106 may utilize one or more of the following for geo-location identification in addition to use of lat/long coordinates and user profile:

Language used in the post, which can be utilized to strengthen the confidence when used in combination with other methods for geo-identification.

Exif (Exchangeable Image File Format) photo metadata of the post, which contains Lat/long data embedded and passed through as part of the photo metadata by a digital device. Social media geo tagging engine 106 parses this embedded location information and associates it to city, state, country labels. Exif data (when present) can be extracted from photos that are shared several sources, including but not limited to twimg.com, yfrog.com, twitpic.com, flickr.com, lockerz.com, img.ly, instagr.am, imgur.com, plixi.com, fotki.com, yandex.ru, tweetphoto.com, livejournal.com, and tinypic.com.

Check-in location data of the author of the post, which can be parsed from a social media source/content stream for users utilizing services such as Foursquare, where the location data can be computed based upon time analysis and frequency analysis of the check-ins to identify the user's location.

Time stamp of the post, which can be used to identify patterns of communication consistent with global time zones, with and chronological profiling applied as social media content items traverse the globe.

Information about the software client used to post the message on the social media site (e.g. a particular mobile application for Twitter®).

Content analysis, which parses the content within the post to identify locations within the content. Statistics can be applied to this data to uncover potential geo-location of users. Indirect content analysis includes, e.g., URLs or references to entities (including websites) that are known to be associated with specific locations. The knowledge of the location associations of such entities may either be set explicitly (e.g., a local newspaper is explicitly associated to the city in which it is published; the Empire State building is explicitly associated to New York city) or such entity location association may be inferred through a variety of methods including the methods described here for associating location to posts and users/authors of posts.

Geo-located hashtags for events in the post, where trending hashtags of known events are identified and associated to the geographic location of where events occur for the events' time periods (e.g., a conference in NYC is trending and people are posting about it using the hash-tag). Citations/Tweets containing hashtags of known events and tweeted within the timeframe of the events' time periods will be associated to the events' location.

In some embodiments, social media geo tagging engine 106 uses the high-confidence geo location information in posts having such information as anchors to identify geographic locations of other content items whose geographic locations (e.g., geo-coordinates) are not available, with relatively high level of confidence, to increase geographic location coverage of the social media content items significantly. Specifically, an archive of historical content items/posts with high-confidence geographic coordinate data can be used as a training set to train a customized probabilistic location classifier. Once trained, the location classifier can then be used to predict the actual geographic locations of the content items without geo-coordinates with high accuracy.

During the training process, social media geo tagging engine 106 reversely geocodes the latitude/longitude coordinates of each post in the training set using an internal lookup table. For geo-tagged posts in the United States, social media geo tagging engine 106 assigns the location based on the lat/long point being found within a defined polygon, associating each content item in the training set with the 4-tuple <country, state, county, city> (or <country, admin1, admin2, city> outside of the US). In some embodiments, social media geo tagging engine 106 uses the U.S. Census Bureau TIGER (Topologically Integrated Geographic Encoding and Referencing) shape files as the source of U.S. polygons. For non-U.S. cities, social media geo tagging engine 106 assigns city names if the coordinates fall within a 10 mile radius around the city center, or uses non-U.S. mapping data to improve foreign city assignment. When coordinates are found across multiple cities due to overlapping radii, social media geo tagging engine 106 may geo-tag the post to one of the cities.

In some embodiments, the location classifier of the social media geo tagging engine 106 recognizes and extracts a set of features related to geographical location from each of the posts in the training set and calculates an observation set of the extracted features as the cross-product of the location vector and feature set, yielding <feature, location> pairs. For a non-limiting example, the term "Giants" can be associated with city of "San Francisco" at the city level of <SF Giants, SF> if 75% of the posts containing "Giants" are determined to be originated from San Francisco (<US, CA, SF, SF>) vs. 25% of the posts are determined to be originated from Oakland (<US, Calif., Alameda, Oakland>) across the San Francisco Bay.

In some embodiments, the information recognized by the location classifier includes but is not limited to:
  detected language of the tweet
  software client/application used to post the tweet
  n-grams in content/text of a post, including any social media content item, e.g. a citation, tweet, comment, chat message, etc.
  n-grams in text of a re-tweet or re-post of the content item
  n-grams in user profile or user location
  n-grams in user description or hashtags
  links in text of the post
  site domains in text of the post
  top-level domains in text of the post
  user time zone preference
  user language preference
  post coordinates (this is also used to train other features in classifier)
  Social media source place node Here, n-grams are a contiguous sequence of items/words of length n from a given sequence of text. The social media source place node is a normalized format to communicate a social network user's current location. Each place node corresponds to an entry in a social media source/network's database of geographical regions and places of interest. The place node may appear in a post under either of two circumstances:

(most common) the user has a geo-enabled device and chooses to make his/her lat/long information public for this post. A social media source/network compares this lat/long to places in its location database to determine the bounding location.

(less common) the user does not make their lat/long public, but does specify a social media source/network location directly.

In some embodiments, social media geo tagging engine 106 aggregates a count of identical <feature, location> pairs and groups them by <feature, location, level>, which shows the full distribution of P(location|feature) for that level. Features with few observations or low correlation to any geographical location are discarded.

Once the location classifier has been trained, social media geo tagging engine 106 continuously applies the location classifier to identify the geographic locations of all social media content items (citations, tweets, posts, etc.) retrieved from a social media network via a social media source in real time. When a new post lacking geographic (e.g., lat/long) information is found, the trained location classifier of social media geo tagging engine 106 uses the P(location|feature) model generated from the training set to predict the geographic location of the new post based on the features of the new post. Social media geo tagging engine 106 normalizes the output from the location classifier into standard location identifiers around country, state, and city to determine the geographic location of the post.

In some embodiments, once geographic location of a post has been identified, the social media geo tagging engine 106 may further compare the identified location of the post with the determined geographic locations of prior posts by the same subject/author. The newly identified location is confirmed if it matches with the location of the majority of the previous posts by the same author. Otherwise, the location of the majority of the previous posts by the author may be chosen as the geographic location of the new post instead. As a result, 98% of the posts can be geo-tagged at the country level or city/state level in US.

Figure 29:
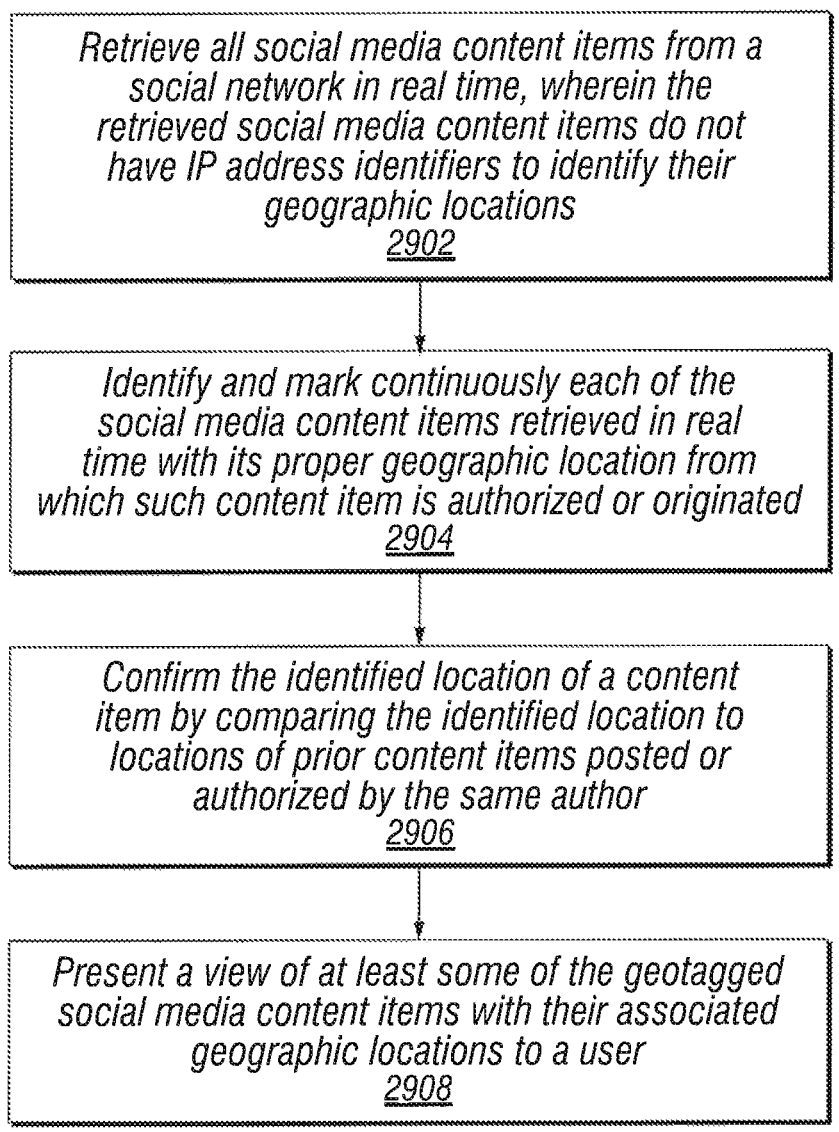
FIG. 29 depicts an example of a flowchart of a process to support geo-tagging of social media content items collected over social networks.

FIG. 29 depicts an example of a flowchart of a process to support geo-tagging of social media content items collected over social networks. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 29, the flowchart 2900 starts at block 2902 where all social media content items from a social network are retrieved in real time, wherein the retrieved social media content items do not have IP address identifiers to identify their geographic locations. The flowchart 2900 continues to block 2904 where each of the social media content items retrieved in real time is continuously identified and marked with its proper geographic location from which such content item is authored or originated. The flowchart 2900 continues to block 2906 where the identified location of a content item is confirmed by comparing the identified location to locations of prior content items posted or authored by the same author. The flowchart 2900 ends at block 2908 where a view of at least some of the geo-tagged social media content items with their associated geographic locations is presented to a user.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

What is claimed is:

1. A system, comprising:
   a processing system;
   a memory coupled to the processing system though a bus; and
   a process executed from the memory by the processing system that causes the processing system to
      continuously retrieve social media items from a social network in real time, wherein the retrieved social media items do not have IP address identifiers to identify their geographic locations;
      determine a geographic location for each of the social media items retrieved in real time by analyzing n-grams of the content of that social media item for information in this content that indicates the geographic location which is authored or originated from an author, wherein the social media item lacks latitude and longitude location information, the n-grams are a contiguous sequence of words of length N in the content of that social media item,
      determine a geographic location indication of the content using a feature, location probabilistic classifier that uses a training set of location-known content to predict a location for the content without geographic coordinates,
      tag each of the social media items with the corresponding location information,
      in response to the determination of the geographic location, confirm the identified location from the n-grams analysis for each of the social media items by comparing the identified location of this social media item to locations of prior social media items posted or authored by the same author, and
   present a view of at least some of the geo-tagged social media content items with their associated geographic locations to a user.

2. The system of claim 1, wherein:
   the social network is a publicly accessible web-based platform or community that enables its users/members to post, share, communicate, and interact with each other.

3. The system of claim 1, wherein:
   the social network is one of any other web-based communities.

4. The system of claim 1, wherein:
   the content items on the social media network include one or more of citations, tweets, replies and/or re-tweets to the tweets, posts, comments to other users' posts, opinions, feeds, connections, references, links to other websites or applications, or any other activities on the social network.

5. The system of claim 1, wherein the process further causes the processing system to
   determine geographic location of a social media item from profile information of the author/user of the social media item, wherein the user's profile contains the user's self-described geographic location.

6. The system of claim 1, wherein the process further causes the processing system to:
   determines geographic location of a social media item based on one or more of: Exif photo metadata of the social media item, check-In location data of the author of the social media item, time stamp of the social media item, and geo-located hashtags for events in the social media item.

7. The system of claim 1, wherein the process further causes the processing system to:
   utilize the geographic location information of the social media items having such information to identify geographic locations of other social media items which geographic locations are not available.

8. The system of claim 7, wherein the process further causes the processing system to:
utilize historical archive of social media items with known geographic coordinate data as a training set to train the feature, location probabilistic classifier to predict geographic locations of the social media items which geographic locations are not available.

9. The system of claim 8, wherein the process further causes the processing system to:
assign geographic location to a social media item in the training set in the form of city, state, or country by reverse geocoding of the latitude/longitude coordinates of the social media item.

10. The system of claim 8, wherein:
the feature, location probabilistic location classifier recognizes and extracts a set of features related to geographical location from each of the posts in the training set and calculates an observation set of the extracted features as the cross-product of the location vector and feature set, yielding <feature, location> pairs.

11. The system of claim 8, wherein the process further causes the processing system to:
apply the feature, location probabilistic location classifier to identify the geographic location of each of the social media items retrieved from the social media network in real time.

12. The system of claim 1, wherein the process further causes the processing system to:
present the social media items on a map with shading indicating the relative volume of the social media items at their respective geographic locations on the map.

13. The system of claim 12, wherein the process further causes the processing system to:
enable the map to be zoomed in focus on metrics of the social media content items at region, country, city or state level.

14. The system of claim 12, wherein the process further causes the processing system to:
shade the map based on a polynomial function that colors the map by default based on the volume of social media items at their geographic locations.

15. A method, comprising:
retrieving social media items from a social network in real time, wherein the retrieved social media items do not have IP address identifiers to identify their geographic locations;
determining a geographic location for each of the social media items retrieved in real time by analyzing n-grams of the content of that social media item which is authored or originated from an author for information in this content that indicates the geographic location, wherein the social media item lacks latitude, longitude location information and the n-grams are a contiguous sequence of words of length N in the content of that social media item;
determining a geographic location indication of the content using a feature, location probabilistic classifier that uses a training set of location-known content to predict a location for the content without geographic coordinates;
tagging each of the social media items with the corresponding location information;
in response to the determination of the geographic location, confirming the identified location from the n-grams analysis for each of the social media items by comparing the identified location of this social media item to locations of prior social media items posted or authored by the same author; and
presenting a view of at least some of the geo-tagged social media items with their associated geographic locations to a user.

16. The method of claim 15, further comprising:
identifying the geographic location of a social media item using the latitude/longitude coordinates of the social media item when the user/author of the social media item opts in to share the GPS location of the device where the social media item is originated.

17. The method of claim 15, further comprising:
identifying the geographic location of a social media item from profile information of the author/user of the social media item, wherein the user's profile contains the user's self-described geographic location.

18. The method of claim 15, further comprising:
identifying the geographic location of a social media item based on one or more of: language used in the social media item, Exif photo metadata of the social media item, check-In location data of the author of the social media item, time stamp of the social media item, content analysis of the social media item, and geo-located hashtags for events in the social media item.

19. The method of claim 15, further comprising:
utilizing the geographic location information of the social media items having such information to identify geographic locations of other social media items which geographic locations are not available.

20. The method of claim 19, further comprising:
utilizing historical archive of social media items with known geographic coordinate data as a training set to train the feature, location probabilistic location classifier to predict geographic locations of the social media items which geographic locations are not available.

21. The method of claim 20, further comprising:
assigning geographic location information to a social media item in the training set in the form of city, state, or country by reverse geocoding of the latitude/longitude coordinates of the social media item.

22. The method of claim 20, further comprising:
recognizing and extracting a set of features related to geographical location from each of the posts in the training set and calculates an observation set of the extracted features as the cross-product of the location vector and feature set, yielding <feature, location> pairs.

23. The method of claim 20, further comprising:
applying the feature, location probabilistic classifier to identify the geographic location of each of the social media items retrieved from the social media network in real time.

24. The method of claim 15, further comprising:
presenting the social media items on a map with shading indicating the relative volume of the social media items at their respective geographic locations on the map.

25. The method of claim 24, further comprising:
enabling the map to be zoomed in to focus on metrics of the social media items at region, country, city or state levels.

26. The method of claim 24, further comprising:
shading the map based on a polynomial function that colors the map by default based on the volume of social media items at their geographic locations.

27. A non-transitory machine-readable medium containing executable program instructions which when executed by a data processing device cause the device to perform a method, the method comprising:

retrieving social media items from a social network in real time, wherein the retrieved social media items do not have IP address identifiers to identify their geographic locations;

determining a geographic location for each of the social media items retrieved in real time by analyzing n-grams of content of that social media item which is authored or originated from an author for information in this content that indicates the geographic location, wherein the social media item lacks latitude and longitude location information, the n-grams are a contiguous sequence of words of length N in the content of that social media item;

determining a geographic location indication of the content using a feature, location probabilistic classifier that uses a training set of location-known content to predict a location for the content without geographic coordinates;

tagging each of the social media items with the corresponding location information;

in response to the determination of the geographic location, confirming the identified location from the n-grams analysis for each of the social media items by comparing the identified location of this social media item to locations of prior social media items posted or authored by the same author; and presenting a view of at least some of the geo-tagged social media items with their associated geographic locations to a user.

28. The system of claim 1, wherein:
the feature, location probabilistic classifier further determines the geographic location of the social media item using a language used in the content of the social media item.

29. The method of claim 15, the feature, location probabilistic classifier further determines the geographic location of the social media item using on a language used in the content of the social media item.

30. The system of claim 1, wherein the information is a hashtag.

31. The method of claim 15, wherein the information is a hashtag.

* * * * *